(12) United States Patent
Takagi

(10) Patent No.: US 11,033,900 B2
(45) Date of Patent: Jun. 15, 2021

(54) METHOD FOR ISOLATING OR DETECTING RARE CELL

(71) Applicant: ARKRAY, Inc., Kyoto (JP)

(72) Inventor: Hidenori Takagi, Kyoto (JP)

(73) Assignee: ARKRAY, Inc., Kyoto (JP)

( * ) Notice: Subject to any disclaimer, the term of this patent is extended or adjusted under 35 U.S.C. 154(b) by 0 days.

(21) Appl. No.: 15/078,463

(22) Filed: Mar. 23, 2016

(65) Prior Publication Data

US 2017/0072396 A1    Mar. 16, 2017

(30) Foreign Application Priority Data

Mar. 23, 2015 (JP) .............................. JP2015-060034
Mar. 22, 2016 (JP) .............................. JP2016-057313

(51) Int. Cl.
| | | |
|---|---|---|
| *B01L 3/00* | (2006.01) | |
| *G01N 1/40* | (2006.01) | |
| *G01N 15/06* | (2006.01) | |
| *B01D 27/00* | (2006.01) | |
| *G01N 15/14* | (2006.01) | |
| *G01N 15/00* | (2006.01) | |

(52) U.S. Cl.
CPC ........ *B01L 3/502753* (2013.01); *B01D 27/00* (2013.01); *B01L 3/502715* (2013.01); *G01N 1/4077* (2013.01); *G01N 15/0625* (2013.01); *B01L 2200/0652* (2013.01); *B01L 2300/0681* (2013.01); *G01N 2001/4088* (2013.01); *G01N 2015/0065* (2013.01); *G01N 2015/1486* (2013.01)

(58) Field of Classification Search
None
See application file for complete search history.

(56) References Cited

U.S. PATENT DOCUMENTS

| | | | |
|---|---|---|---|
| 8,551,425 | B2 | 10/2013 | Goldkorn et al. |
| 2011/0244443 | A1* | 10/2011 | van Rijn .......... G01N 33/57492 |
| | | | 435/2 |
| 2012/0129252 | A1 | 5/2012 | Seubert |

(Continued)

FOREIGN PATENT DOCUMENTS

| | | |
|---|---|---|
| CN | 103298546 A | 9/2013 |
| CN | 104039948 A | 9/2014 |

(Continued)

OTHER PUBLICATIONS

Hosokawa et al., Size-selective Microcavity Array for Rapid and Efficient Detection of Circulating Tumor Cells, 82 Anal. Chem. 6629, 6629-6635 (2010). (Year: 2010).*

(Continued)

*Primary Examiner* — Krishnan S Menon
*Assistant Examiner* — Brad Gordon
(74) *Attorney, Agent, or Firm* — Morgan, Lewis & Bockius LLP

(57) ABSTRACT

A method for treating a blood specimen with which capturing rates for both a small rare cell and a rare cell having a high deformability can be improved in the case where rare cells are contained in a blood specimen. The method for isolating or detecting a rare cell includes treating a blood specimen using a filter to isolate or detect a rare cell in the blood specimen.

13 Claims, 8 Drawing Sheets

(56) References Cited

U.S. PATENT DOCUMENTS

| | | | |
|---|---|---|---|
| 2012/0178097 A1* | 7/2012 | Tai | G01N 33/5011 435/7.1 |
| 2013/0288273 A1* | 10/2013 | Takagi | G01N 33/582 435/7.23 |
| 2015/0004687 A1 | 1/2015 | Kikuhara et al. | |
| 2015/0087016 A1 | 3/2015 | Takagi | |
| 2015/0111293 A1 | 4/2015 | Kanbara et al. | |
| 2019/0033186 A1* | 1/2019 | Nakamura | G01N 33/574 |
| 2019/0338234 A1* | 11/2019 | Itou | C25D 5/10 |

FOREIGN PATENT DOCUMENTS

| | | |
|---|---|---|
| JP | 2010-530234 A | 9/2010 |
| JP | 2010-227011 A | 10/2010 |
| JP | 2011-163830 A | 8/2011 |
| JP | 2013-017429 A | 1/2013 |
| JP | 5141919 B2 | 2/2013 |
| JP | 2013-042689 A | 3/2013 |
| JP | 2013-255487 A | 12/2013 |
| WO | 2008/155398 A | 12/2008 |
| WO | 2014/142754 A1 | 9/2014 |

OTHER PUBLICATIONS

Vona et al., "Isolation by Size of Epithelial Tumor Cells: A New Method for the Immunomorphological and Molecular Characterization of Circulating Tumor Cells," American Journal of Pathology, 156: 57-63 (2000).

Coumans et al., "Filter Characteristics Influencing Circulating Tumor Cell Enrichment from Whole Blood," PLOS One, 8: e61770 (2013).

Park et al., "Morphological differences between Circulating Tumor Cells from Prostate Cancer Patients and Cultured Prostate Cancer Cells," PLOS One, 9: e85264 (2014).

Xu et al., "Cell Stiffness Is a Biomarker of the Metastatic Potential of Ovarian Cancer Cells," PLOS One, 7: e46609 (2012).

Zhang et al., "Microfluidics separation reveals the stem-cell-like deformability of tumor-initiating cells," PNAS, 1-6 (2012).

Negishi et al., "Development of the automated circulating tumor cell recovery system with microcavity array," Biosensors and Bioelectronics, 67: 438-442 (2014).

Matsusaka et al., "A novel detection strategy for living circulating tumor cells using 5-aminolevulinic acid," Cancer Letters, 355: 113-120 (2014).

Extended European Search Report issued in corresponding European Patent Application No. 16162056.2 dated Aug. 19, 2016.

Office Action issued in corresponding Chinese Patent Application No. 201610169565.1 dated Jul. 30, 2019.

Office Action issued in corresponding Japanese Patent Application No. 2016-057313 dated Aug. 6, 2019.

Lu et al., "Parylene Membrane Slot Filter for the Capture, Analysis and Culture of Viable Circulating Tumor," MEMS 2020: 23rd IEEE International Conference on Micro Electro Mechanical Systems, Technical Digest, Proceedings: IEEE Micro Electro Mechanical Systems, IEEE, 935-938 (2010).

Office Action issued in corresponding Chinese Patent Application No. 201610169565.1 dated Mar. 20, 2020 (see partial English translation).

* cited by examiner

METHOD FOR ISOLATING OR DETECTING RARE CELL

BACKGROUND OF THE INVENTION

1. Field of the Invention

The present disclosure relates to a method for isolating or detecting a rare cell in a blood specimen, a method for analyzing a circulating tumor cell, a filter to be used in these methods, and a rare cell capturing apparatus.

2. Description of Related Art

Blood cell components mainly include an erythrocyte, a leukocyte, and a platelet, and cells other than these cells may be present in the blood in very rare cases. One example of such rare cells is a circulating tumor cell (CTC). The CTC is a cell that is released from a primary tumor tissue or a metastatic tumor tissue and invades the blood. Cancer metastases may be caused by cancer cells being carried to different parts in a body through blood vessels and lymphatic vessels and proliferating, and it has been reported that the number of the CTCs in the blood may indicate or determine with the possibility of a cancer metastasis and the prognosis of cancer. Therefore, the CTCs may be used as indices for the diagnosis, prognosis, prediction or determination of progress, presence or absence of cancer, for example, including metastatic cancer such as breast cancer, by counting the number of the CTCs in the blood and detecting or measuring the nucleic acid specific to the CTC. Various methods for isolating and concentrating the CTC in the blood have been proposed (see Patent Documents 1 to 5 and Non-Patent Documents 1 to 6, for example).

Patent Document 1: JP 2013-17429A
Patent Document 2: JP 2010-530234A
Patent Document 3: Japanese Patent No. 5141919
Patent Document 4: JP 2013-42689A
Patent Document 5: JP 2011-163830A
Non-Patent Document 1: Vona G, Sabile A, Louha M, Sitruk V Romana S, Schutze K, Capron F, Franco D, Pazzagli M, Vekemans M, Lacour B, Brechot C, Paterlini-Brechot P. Isolation by Size of Epithelial Tumor Cells: A New Method for the Immunomorphological and Molecular Characterization of Circulating Tumor Cells, Am J Pathol. 2000 January; 156(1):57-63
Non-Patent Document 2: Coumans F A, van Dalum G, Beck M, Terstappen L W (2013) Filter Characteristics Influencing Circulating Tumor Cell Enrichment from Whole Blood, April|Volume 8|Issue 4|e61770
Non-Patent Document 3: Park S, Ang R R, Duffy S P, Bazov J, Chi K N, Black P C, Ma H (2014) Morphological differences between circulating tumor cells from prostate cancer patients and cultured prostate cancer cells, PLOSONE January 2014|Volume 9|Issue 1|e85264
Non-Patent Document 4: Xu W, Mezencev R, Kim B, Wang L, McDonald J, Sulchek T. (2012) October 2012|Volume 7|Issue 10|e46609 Cell Stiffness Is a Biomarker of the Metastatic Potential of Ovarian Cancer Cells
Non-Patent Document 5: Zhang W Kai K, Choi D S, Iwamoto T, Nguyen Y H, Wong H, Landis M D, Ueno N T, Chang J, Qin L. (2012) Microfluidics separation reveals the stem-cell-like deformability of tumor-initiating cells.
Non-Patent Document 6: R. Negishi et al. Development of the automated circulating tumor cell recovery system with microcavity array, Biosensors and Bioelectronics (2014)

SUMMARY OF THE INVENTION

In general, several tens of billions of erythrocytes and several tens of millions of leukocytes are contained in 10 ml of the blood, whereas zero to several rare cells, including the CTCs, are contained therein, and several thousands of the rare cells are contained therein at most. These rare cells, however, include medically important cells, such as immunocytes and the above-described cells that are thought to indicate different degrees of cancer metastases. For example, the rare cells may include CTCs that are small cancer cells and cancer cells having a high deformability, which are reported to be highly metastatic.

Analyzing and detecting the CTCs in a blood sample, however, is challenging. For example, if there are only two CTCs in 10 ml of a blood sample, according to Poisson distribution, when 1 ml of the blood sample is analyzed, a detection rate of 20% or less is expected even assuming that 100% of the CTCs can be captured. When a larger amount of the blood, for example, 8 ml of the blood sample, is analyzed, the probability that one or more CTCs are present can be increased to about 90%. When the amount of the blood sample increases and the number of filters thus increases, however, the configuration of the analysis becomes complicated. Therefore, a filter capable of filtering a large amount of a blood sample at one time is desired.

In some embodiments, the present disclosure provides a filter and a method for isolating, concentrating, filtering, treating and/or analyzing a blood specimen in which both (i) a small rare cell and (ii) a rare cell having a high deformability can be efficiently and easily detected or captured.

In some embodiments, the present disclosure relates to a method for isolating or detecting a rare cell including filtering a blood specimen using a filter to isolate or detect a rare cell in the blood specimen.

In additional embodiments, the present disclosure relates to a filter including holes having an average minor axis diameter of 5 μm or more and 8 μm or less and an average major axis diameter of 40 μm or more and 5000 μm or less at a hole density of 40 holes/mm$^2$ or more and 2000 holes/mm$^2$ or less with a ratio (w/z) between the average major axis diameter (w) and an average gap length (z) between the holes in an minor axis diameter direction being 7.0 or more and 130 or less.

In further embodiments, the present disclosure relates to a rare cell capturing apparatus including: an inlet; an outlet; a channel connecting the inlet and the outlet; and an isolating portion, wherein the isolating portion is arranged at a position corresponding to a portion of the channel, and includes the above-mentioned filter and a holding portion for holding the filter.

BRIEF DESCRIPTION OF THE DRAWINGS

FIG. 3 shows the relationship between the average minor axis diameter and the capturing rate for SW620 cells, which are small cells.

FIG. 7A shows results when filtration pressure (ΔP1) in the entire system is 0.4 kPa,
and FIG. 7B shows results when filtration pressure (ΔP1) in the entire system is 1.3 kPa.

DETAILED DESCRIPTION OF THE INVENTION

Figure 1:
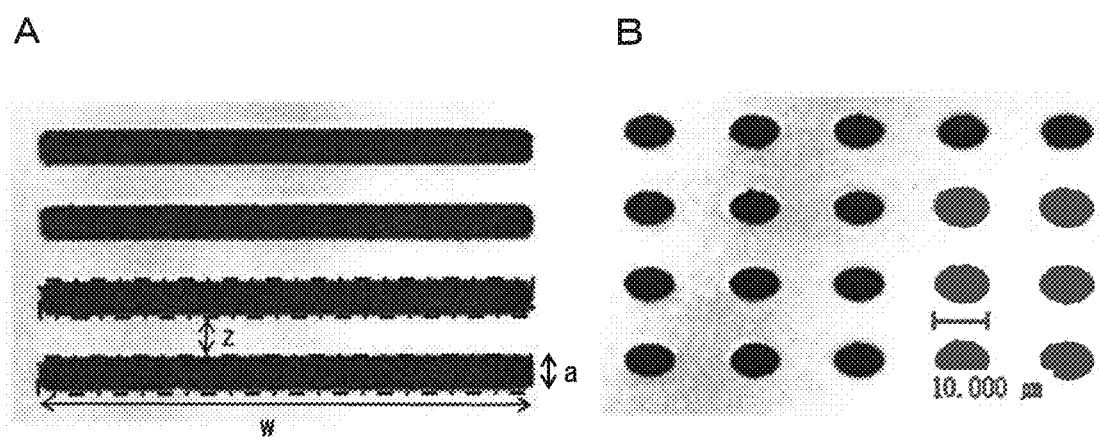
FIG. 1 shows filters. Item A in FIG. 1 shows an exemplary filter (with slit-shaped holes) according to some embodiments of the present disclosure, and item B in FIG. 1 shows a comparative filter (with elliptical holes) according to a comparative example.

When the diameter of holes of a filter is reduced, it is difficult to capture the cell having a high deformability, whereas when the hole diameter is increased in accordance with the capturing rate for the cell having a high deformability, the small rare cell is likely to pass through the filter. Thus, it is difficult to capture both the small cancer cell and the cancer cell having a high deformability using a filter with perfectly circular holes.

In one aspect, both the small rare cell and the rare cell having a high deformability in a blood specimen can be efficiently and easily captured by filtering the blood specimen through a filter described herein. In some embodiments, the filter may include holes having an average minor axis diameter of 5 μm or more and 8 μm or less and an average major axis diameter of 40 μm or more at a hole density of 40 holes/mm$^2$ or more and 2000 holes/mm$^2$ or less with a ratio (w/z) between the average major axis diameter (w) and the average gap length (z) between the holes in a minor axis diameter direction being 7.0 or more and 130 or less. In another aspect, by filtering a blood specimen using the above-mentioned filter, the filtration pressure condition, for example, including, a filtration pressure in the entire system, and a difference between pressures on the upper surface and the lower surface of the filter during the filtering, may be lowered during the filtering. As a result, the capturing rate for the rare cell having a high deformability may be further increased, damage to the cell during the capturing of the cell may be reduced, and the viable rare cell may be collected. In another aspect, by filtering a blood specimen using the above-mentioned filter, for example, in a case where the filtering capacity per hole of the filter is large, the variation in the capturing rate for the rare cell due to the difference between specimens may be reduced, and the rare cell may be captured at a high capturing rate compared with a filter with elliptical holes or perfectly circular holes, even when a specimen has a high concentration of hematocrit and/or leukocytes. In another aspect, although the capturing rate for the rare cell decreases when a large amount of blood, for example, about 8 to 10 ml of blood, is filtered, the capturing rate for the rare cell having a high deformability may be further improved by filtering a blood specimen using the above-mentioned filter according to the present disclosure such that the filtering capacity per hole of the filter is 0.1 nl/μm$^2$ or more and 3 nl/μm$^2$ or less in terms of a treatment or filter capacity per hole area of the filter.

In another aspect, by using the filters and methods described herein, a cell captured by the filter may be easily stained, observed, for example, by a microscope, or identified as a hemocyte component, a CTC, or the like. In the case where the cells on the filter are stained, washed, imaged and/or observed, the larger a filtration area is, the more complicated the operations are because the reagent amount, the washing amount, and the image and observation range increase. Therefore, a filter having a reduced filtration area or a filter housing having a reduced capacity is desired. With the method according to some embodiments of the present disclosure, the filtration area of a filter with respect to the required filtering amount of the blood may be reduced.

[Rare Cell]

In the present disclosure, a "rare cell" that can be contained in the blood or a blood specimen is a cell other than an erythrocyte, a leukocyte, and a platelet that can be contained in the blood of a human or an animal other than a human. Examples of the rare cell include a tumor cell and/or a cancer cell. A tumor cell or a cancer cell that circulates in the blood is generally called a circulating tumor cell (CTC). Depending on the specimen, the number of the rare cells in 10 ml of blood may be several to several tens, and several hundreds to several thousands at most. In some embodiments, the "rare cell" is a cell selected from the group consisting of a cancer cell, a circulating tumor cell, a vascular endothelial cell, a vascular endothelial precursor cell, a cancer stem cell, an epithelial cell, a hematopoietic stem cell, a mesenchymal stem cell, a fetal cell, a stem cell, and combinations thereof.

[Small Rare Cell]

In the present disclosure, a "small rare cell" is a rare cell having a small diameter. In some embodiments, one example thereof is a rare cell having a size with which the cell passes through a perfectly circular hole having a diameter of about 10 μm. In additional embodiments, the small rare cell may include rare cells having a diameter of about 10, 9, 8, 7, 6, 5, or 4 μm or less, and about 1, 2, 3, 4, 5 or 6 μm or more.

As used herein, the term "about" means modifying, for example, degrees of errors, dimensions, the quantity of an ingredient in a composition, concentrations, volumes, process temperature, process time, yields, flow rates, pressures, and like values, and ranges thereof, refers to variation in the numerical quantity that may occur, for example, through typical measuring and handling procedures used for making compounds, compositions, concentrates or use formulations; through inadvertent error in these procedures; through differences in the manufacture, source, or purity of starting materials or ingredients used to carry out the methods; and like considerations. The term "about" also encompasses amounts that differ due to aging of, for example, a composition, formulation, or cell culture with a particular initial concentration or mixture, and amounts that differ due to mixing or processing a composition or formulation with a particular initial concentration or mixture. Whether modified by the term "about" the claims appended hereto include equivalents to these quantities. The term "about" further may refer to a range of values that are similar to the stated reference value. In certain embodiments, the term "about" refers to a range of values that fall within 10, 9, 8, 7, 6, 5, 4, 3, 2, 1 percent or less of the stated reference value.

[Rare Cell Having High Deformability]

In the present disclosure, a "rare cell having a high deformability" is a cell that has a cell size of about 10 μm or more and that can pass through a perfectly circular hole having a diameter of 5 μm or more and 6.5 μm or less. In some embodiments, one example of the rare cell having a high deformability is a rare cell that is more likely to pass through the hole (that is, the ratio of the cells passing through the hole is larger) compared with a rare cell having a similar size in the case where the whole blood is fed to a filter with perfectly circular holes having a diameter of 5 μm or more and 6.5 μm or less with a treatment amount of the blood specimen per hole of 14 nl or more at 5 nl/min or more and 20 nl/min or less per hole. In some embodiments, one example of a cancer cell having a high deformability is a SNU-1 cell.

In some embodiments, the rare cell having a high deformability may have a cell size of about 10, 12, 14, 16, 18, 20, 25, 30, 40, 50, 60, 70, 80, or 90 µm or more, and about 200, 150, 120, 110, 100, 90, 80, 70, 60, 50, 40, 30, 20 or 15 µm or less. In additional embodiments, the rare cell having a high deformability passes through a perfectly circular hole having a diameter of 5 or 6 µm or more and 6.5, 6, or 5.5 µm or less.

[Blood Specimen]

In the present disclosure, a "blood specimen" means a sample that can be used in the filtering method according to the present disclosure and that contains the components constituting the blood, and examples thereof include the blood, a blood derived substance containing an erythrocyte component, a body fluid or urine containing the blood or blood derived substance, and samples prepared therefrom. One example of the blood is the blood collected from a living organism, and examples of the living organism include a human or an animal (e.g., a mammal) other than a human. Examples of the blood derived substance containing an erythrocyte component include a substance that is isolated or prepared from the blood and contains an erythrocyte component, or a dilution/concentrate thereof. For example, the blood derived substance includes a hemocyte fraction obtained by removing blood plasma, a hemocyte concentrate, a substance obtained by freeze-drying the blood or hemocytes, a sample obtained by hemolyzing the whole blood and removing the erythrocyte component or a hemolyzed sample, centrifuged blood, spontaneously precipitated blood, washed hemocytes, a specific fraction, and the like. In some embodiments, from the viewpoint of a simple and rapid treatment and the suppression of damage to the rare cell in the blood, the blood or hemocytes that are derived from the blood and contain the hemocyte components out of these may be preferable as the above-mentioned sample containing the blood.

In the present disclosure, the volume of a blood specimen that passes through one hole of the filter is determined using blood collected from a human body, that is, blood containing 1000 to 20000 leukocyte cells per microliter, as a reference. Therefore, when a diluted blood specimen is used, it is easy to convert the volume of the diluted blood specimen into the volume of the blood specimen before dilution based on the number of leukocytes. Specifically, when 10-fold diluted blood specimen is treated, treating the volume of "X" µl/hole of the diluted blood specimen corresponds to treating the volume of "X/10" µl/hole of the blood specimen before dilution.

[Method for Treating Blood Specimen]

An aspect of the present disclosure relates to a method for filtering a blood specimen (referred to also as "treatment method according to the present disclosure" hereinafter).

<Filter>

A filter used in filtering in the treatment method according to some embodiments of the present disclosure is a slit filter with a plurality of through pores (holes) having an average minor axis diameter of 5 µm or more and 8 µm or less and an average major axis diameter of 40 µm or more. In additional embodiments, the through pores formed in the filter have a substantially uniform size, and it is more preferable that the through pores have substantially the same minor axis diameter and major axis diameter. In further embodiments, "the through pores have substantially the same minor axis diameter" means that the minor axis diameters of at least 90% of the through pores of the filter are in a range of the average minor axis diameter±1 µm, ±0.5 µm, ±0.4 µm, ±0.3 µm, or ±0.2 µm, the average minor axis diameter being obtained with a method described below. Moreover, in one or more embodiments, "the through pores have substantially the same major axis diameter" means that the major axis diameters of at least 90% of the through holes of the filter are in a range of the average major axis diameter±3 µm, ±2 µm, ±1 µm, ±0.5 µm, ±0.3 µm, or ±0.2 µm, the average major axis diameter being obtained in the same manner as described above. In some embodiments, the minor axis diameters of at least about 100, 99, 98, 95, 90, 85, 80, 75, 70, 65, 60, 55, or 50% of the through holes of the filter described herein are in ranges of the average minor axis diameter±1 µm, ±0.5 µm, ±0.4 µm, ±0.3 µm, or ±0.2 µm. In additional embodiments, the major axis diameters of at least about 100, 99, 98, 95, 90, 85, 80, 75, 70, 65, 60, 55, or 50% of the through holes of the filter described herein are in ranges of the average major axis diameter±3 µm, ±2 µm, ±1 µm, ±0.5 µm, ±0.3 µm, or ±0.2 µm.

In one or more embodiments, from the viewpoint of improving the capturing rate for the small rare cell, the average minor axis diameter may be about 5 µm or more, more than 5 µm, 5.5 µm or more, 6 µm or more, or 6.5 µm or more. From the same viewpoint, the average minor axis diameter may be about 8 µm or less, less than 8 µm, 7.5 µm or less, 7 µm or less, or 6.5 µm or less. When the average minor axis diameter is 5 µm or more, the capturing rate for the rare cell having a high deformability may be increased and the clogging of the filter can be decreased, as a result of which the rare cell can be collected at a high capturing rate. In the present disclosure, the "minor axis diameter" is a short side of a rectangle that is circumscribed about the hole (see item A in FIG. 1). The minor axis diameters and their average value may be obtained by using a commercially available optical microscope such as a metallographic microscope and a laser microscope, or an electron microscope to perform measurements (at 50 or more points) with a known method using software packaged with the above-mentioned microscope or commercially available image analysis software, and determining the average value, for example. In some embodiments, the minor axis diameters and their average value may be determined with a method described in the Examples.

In one or more embodiments, from the viewpoint of improving the capturing rate for the rare cell having a high deformability, the average major axis diameter may be about 40 µm or more, 50 µm or more, 60 µm or more, 70 µm or more, or 80 µm or more. From the viewpoint of suppressing bending, distortion, and the like of the filter to improve the capturing rate for the rare cell, the average major axis diameter may be about 5000 µm or less, 4000 µm or less, 3000 µm or less, 2000 µm or less, 1000 µm or less, 970 µm or less, 900 µm or less, 800 µm or less, 700 µm or less, 600 µm or less, 500 µm or less, 400 µm or less, 300 µm or less, 200 µm or less, 150 µm or less, 120 µm or less, 100 µm or less, 90 µm or less, or 80 µm or less. In the present disclosure, the "major axis diameter" is a long side of a rectangle that is circumscribed about the hole (see item A in FIG. 1). The major axis diameters and their average value may be obtained by using a commercially available optical microscope such as a metallographic microscope and a laser microscope, or an electron microscope to perform measurements (at 50 or more points) with a known method using software packaged with the above-mentioned microscope or commercially available image analysis software, and determining the average value, for example. In some embodiments, the major axis diameters and their average value may be determined with a method described in the Examples.

In some embodiments, the filter used in the filtering in the treatment method according to some embodiments of the present disclosure includes the holes having the above-mentioned minor axis diameter and major axis diameter at a hole density of 40 holes/mm² or more and 2000 holes/mm² or less. From the viewpoint of further improving the capturing rate for the rare cell having a high deformability and the viewpoint of suppressing the filtration area, the hole density (the number of holes per square millimeter) may be about 45 holes/mm² or more, 60 holes/mm² or more, 70 holes/mm² or more, 90 holes/mm² or more, 200 holes/mm² or more, 300 holes/mm² or more, 400 holes/mm² or more, 500 holes/mm² or more, 600 holes/mm² or more, or 700 holes/mm² or more. From the same viewpoints, the hole density may be about 1500 holes/mm² or less, 1000 holes/mm² or less, 900 holes/mm² or less, or 800 holes/mm² or less. The hole density may be measured with a known method. For example, an image is taken using a commercially available optical microscope equipped with a 10-fold to 100-fold objective lens, and then the hole density may be calculated from the image using software packaged with the above-mentioned microscope or commercially available image analysis software.

The total number of the holes included in the filtration surface of the filter may be determined by dividing the filtration area by the lengths of pitches between the centers of the holes. In addition, the total number of the holes included in the filtration surface of the filter may be determined by multiplying the hole density by the filtration area. Specifically the total number of the holes can be determined with a method described in the Examples.

In the filter used in the filtering in the treatment method according to the present disclosure, the holes having the above-mentioned minor axis diameter and major axis diameter are formed such that a ratio (w/z) between the average major axis diameter (w) and the average gap length (z) between the holes in a minor axis diameter direction is 7.0 or more and 130 or less. From the viewpoint of improving the capturing rates for both the small rare cell and the rare cell having a high deformability, and the viewpoint of reducing the variation depending on the specimen, the w/z may be about 7.3 or more, more than 7.3, 7.5 or more, 8.0 or more, 8.5 or more, 9.0 or more, or 10 or more. From the viewpoint of suppressing bending, distortion, and the like of the filter to improve the capturing rate for the rare cell, the w/z may be about 130 or less, 129 or less, 120 or less, 100 or less, 90 or less, 80 or less, or 70 or less.

In the present disclosure, the "gap length (z) between the holes in a minor axis diameter direction" is the shortest straight line that links the rectangles circumscribed about the holes adjacent to each other in a minor axis diameter direction. From the viewpoint of improving the capturing rates for both the small rare cell and the rare cell having a high deformability and the viewpoint of reducing the variation depending on the specimen, the average gap length (z) between the holes in the minor axis diameter direction may be about 60 µm or less, 50 µm or less, 40 µm or less, 30 µm or less, 20 µm or less, or 10 µm or less. From the viewpoint of suppressing bending, distortion, and the like of the filter to improve the capturing rate for the rare cell, the average gap length (z) between the holes in the minor axis diameter direction may be about 4 µm or more, 5 µm or more, 6 µm or more, 7 µm or more, 7.5 µm or more, 8 µm or more, 9 µm or more, or 10 µm or more. The average gap length (z) between the holes in the minor axis diameter direction may be obtained by analyzing and measuring an image (at 50 or more points) with a known method using software packaged with an electron microscope or a commercially available optical microscope such as a metallographic microscope and a laser microscope, or commercially available image analysis software, and determining the average value. Specifically the gap lengths (z) between the holes in the minor axis diameter direction and their average values may be determined with a method described in the Examples.

In some embodiments, the through pores have substantially the same gap length (z). In further embodiments, "the through pores have substantially the same gap length (z)" means that the gap lengths of at least 90% of the through pores of the filter are in a range of the average gap length±1 µm, ±0.5 µm, ±0.4 µm, ±0.3 µm, or ±0.2 µm, the average minor axis diameter being obtained with a method described below. In additional embodiments, the gap lengths of at least about 100, 99, 98, 95, 90, 85, 80, 75, 70, 65, 60, 55, or 50% of the through holes of the filter described herein are in ranges of the average gap length (z)±1 µm, ±0.5 µm, ±0.4 µm, ±0.3 µm, or ±0.2 µm.

In one or more embodiments, from the viewpoint of further improving the capturing rate for the rare cell having a high deformability and the viewpoint of suppressing the filtration area, the area of one hole of the filter used in the filtering may be about 200 µm² or more and 7000 µm² or less. The area of one hole may be about 250 µm² or more, 260 µm² or more, 300 µm² or more, 350 µm² or more, 390 µm² or more, 400 µm² or more, 500 µm² or more, or 550 µm² or more from the same viewpoints, and is 6800 µm² or less, 6500 µm² or less, 6300 µm² or less, or 6000 µm² or less from the same viewpoints.

In one or more embodiments, from the viewpoint of further improving the capturing rate for the rare cell having a high deformability and the viewpoint of suppressing the filtration area, the filter may have an opening rate of about 10% or more and about 60% or less. The filter may have an opening rate of about 15% or more, 20% or more, 25% or more, 30% or more, 31% or more, 35% or more, or 40% or more from the same viewpoints, and an opening rate of about 55% or less or 45% or less from the same viewpoints. The opening rate may be measured with a known method. For example, an image is taken using a commercially available optical microscope equipped with a 10-fold to 100-fold objective lens, and then the opening rate may be determined from the image using software packaged with the above-mentioned microscope or commercially available image analysis software.

In one or more embodiments, from the viewpoint of improving the capturing rates for both the small rare cell and the rare cell having a high deformability the filter may have a thickness of about 1 µm or more and about 100 µm or less. From the viewpoint of improving the capturing rate for the rare cell while reducing the clogging of the filter, the thickness of the filter may be about 60 µm or less, 50 µm or less, 40 µm or less, 30 µm or less, 20 µm or less, 15 µm or less, or 10 µm or less. From the same viewpoints, the thickness of the filter may be about 2 µm or more, 3 µm or more, 4 µm or more, or 5 µm or more.

There is no particular limitation on the materials of the filter, but in some embodiments, examples of the main component include polycarbonate (PC), a parylene membrane filter, a plastic material having a Young's modulus of 1 GPa or more, a metal such as nickel (Ni), SUS, gold, silver, copper, aluminum, tungsten, and chromium, and a glass material. When the cells on the filter are observed, a plastic, a metal, or a glass material may be selected in accordance with pigments and fluorescent staining used during the observation, and combinations thereof may also be used.

The filter used in the filtering in the treatment method according to the present disclosure may be produced by a known method for producing the filter. In some embodiments, the method includes etching, electroforming processing, laser processing, or spattering processing. In additional embodiments, the filter may be produced by cutting a filter of an arbitrary size from a sheet with the holes being patterned partially or wholly. In further embodiments, the filter may be produced by casting.

<Filtering Condition>

In some embodiments, in the filtering in the treatment method according to the present disclosure, the rare cell, such as the CTC, may be captured by incorporating the above-described filter into a channel and introducing a blood specimen into the channel.

From the viewpoint of further improving the capturing rate for the rare cell having a high deformability, the treatment method according to the present disclosure includes filtering a blood specimen such that the filtering capacity per hole of the filter is 0.1 nl/μm$^2$ or more and 3.0 nl/μm$^2$ or less in terms of a treatment capacity per unit area of the holes of the filter. From the viewpoint of suppressing the filtration area, the filtering capacity per unit area of the holes of the filter may be about 0.1 nl/μm$^2$ or more or 0.2 nl/μm$^2$ or more. From the viewpoint of capturing a cancer cell having a high deformability, the filtering capacity per unit area of the holes of the filter may be about 2.5 nl/μm$^2$ or less, 2 nl/μm$^2$ or less, 1.5 nl/μm$^2$ or less or 1 nl/μm$^2$ or less.

From the viewpoint of further improving the capturing rate for the rare cell having a high deformability, and the viewpoint of reducing damage to the cell captured during the filtering, the filtration pressure ($\Delta P_1$) during the filtering in the treatment method according to the present disclosure may be about 0.1 kPa or more and 2.6 kPa or less. The filtration pressure may be about 0.1 kPa or more or 0.2 kPa or more from the same viewpoints, and may be about 2.0 kPa or less, 1.5 kPa or less, 1.3 kPa or less, 1.0 kPa or less, or 0.5 kPa or less from the same viewpoints. In the present disclosure, the "filtration pressure during the filtering" is a pressure difference in the entire system from the entrance of the system to the exit of the system, and is a pressure difference in the system including a channel from a tank in which a blood specimen is placed to a waste liquid tank, for example. Therefore, the filtration pressure may be larger than the above-mentioned pressure values depending on the structure of the channel. The filtration pressure during the filtering (pressure difference in the system) can be measured with a known method using a commercially available pressure gauge, or is calculated from the relationship between the flow amount and the structure of the channel.

In some embodiments, from the viewpoint of further improving the capturing rate for the rare cell having a high deformability and the viewpoint of reducing damage to the cell captured during the filtering, the difference between pressures on the upper surface and the lower surface of the filter ($\Delta P_2$) during the filtering in the treatment method according to the present disclosure may be about 100 Pa or less. In one or more embodiments, $\Delta P_2$ may be about 0.1 Pa or more or 1 Pa or more from the same viewpoints, and is 70 Pa or less, 50 Pa or less, 30 Pa or less, 15 Pa or less, or 10 Pa or less from the same viewpoints. In the present disclosure, the "difference between pressures on the upper surface and the lower surface of the filter ($\Delta P_2$)" is a difference between the pressure on the upper side of the filter and the pressure on the lower side of the filter (see FIG. 2). The pressure difference can be calculated from a well-known calculation equation. The pressure difference in a slit filter can be determined using the following equation:

$$\Delta P_2 = Q/N_0 \times 12\eta L/[(1-0.63)(h/w)] \times (1/h^3 w)$$

where Q is the total average value of the flow amounts of all the holes, h is the minor axis diameter, w is a major axis diameter, L is the channel length of the hole, η is the viscosity of the liquid to be fed, and $N_0$ is the number of holes. The blood is a non-Newtonian liquid, and even when the systems have the same pressure difference, the average flow rate varies depending on the viscosity, which varies depending on the hematocrit (Hct). Therefore, the average flow rate is in a certain range. In the case where the pressure difference, $\Delta P_2$, is set when the whole blood is used, it is sufficient that the pressure may be set using η of 4.5 mPa·S for the sake of convenience such that $\Delta P_2$ is in the above-mentioned range according to calculations. When a blood specimen has a hematocrit value (Hct) of less than 20 due to dilution or the like, the pressure may be set using η of 1 to 2 mPa·S, such that $\Delta P_2$ is in the above-mentioned range according to calculations. Alternatively when a blood specimen is diluted until the viscosity caused by blood plasma and Hct has no influence (the whole blood is diluted 4 to 10 times, for example), $\Delta P_2$ may be calculated based on the viscosity of the diluted liquid, and the diluted liquid may be fed. When the feeding, supplying, pushing, or passing a sample through a filter is performed at a constant flow amount using a syringe pump or the like, it is sufficient that the feeding, supplying, pushing, or passing is performed such that $\Delta P_2$ is in the above-mentioned range. Such a feeding condition can be achieved using a mechanism capable of performing feeding, supplying, pushing, or passing at a constant pressure, a mechanism capable of performing feeding, supplying, pushing, or passing at a constant flow amount, or the like that is well known to a person skilled in the art.

There is no particular limitation on the filtration area in the filtering in the treatment method according to the present disclosure. In some embodiments, the filtration area can be set based on the number of the holes (hole area) and the treatment amount of the blood. In additional embodiments, from the viewpoint of suppressing the filtration area to reduce the amount of reagents used in the staining operation and labeling operation after the filtering, the viewpoint of the observation operation, and the viewpoint of efficiently capturing the rare cell, the filtration area may be about 5 mm$^2$ or more and 200 mm$^2$ or less. The filtration area may be about 10 mm$^2$ or more from the same viewpoints, and is 150 mm$^2$ or less, 100 mm$^2$ or less, or 80 mm$^2$ or less from the same viewpoints. From the viewpoint of suppressing the filtration area of the filter with respect to the treatment amount of the blood, the filtration area may be about 100 mm$^2$ or less, 80 mm$^2$ or less, 50 mm$^2$ or less, 40 mm$^2$ or less, 30 mm$^2$ or less, or 25 mm$^2$ or less.

Although there is no particular limitation on the feeding, supplying, pushing, or passing of a blood specimen into a channel in the filtering in the treatment method according to the present disclosure, it is sufficient that there is a driving force with which the blood specimen can be fed. In some embodiments, examples of a method for introducing a blood specimen into a channel include a method of applying pressure at the entrance of the channel, a method of reducing pressure at the exit of the channel, and a method using a syringe pump or a peristaltic pump. By feeding, supplying, pushing, or passing a blood specimen at the average flow rate of about 1 mm/min or more and 600 mm/min or less per hole of the filter, for example, for the purpose of introducing the blood specimen into a channel, the rare cell can be more appropriately captured compared with a conventional example. In additional embodiments, the condition for the feeding, supplying, pushing, or passing of a blood specimen is a flow rate of about 2 mm/min or more and 300 mm/min or less, a flow rate of 3 mm/min or more and 100 mm/min or less, a flow rate of 4 mm/min or more and 80 mm/min or less, or a flow rate of 4 mm/min or more and 40 mm/min or less. The feeding condition may also be set in terms of the average flow amount. A method for calculating the average flow amount per hole may be as follows: the average flow amount is determined by measuring the flow amount at the exit for a filtration waste liquid per unit time (total average value of the flow amounts of all the holes) or the filtration time per unit amount, and then the average flow amount is divided by the number of the holes to obtain the average flow amount per hole. Moreover, the average flow rate may be determined by dividing the average flow amount by the hole area. The feeding, supplying, pushing, or passing may be performed such that the average flow rate per hole or the average flow amount is in the above-described range. In one or more embodiments, the average flow rate may be calculated by dividing the flow amount at the exit for a filtration waste liquid (total average value of the flow amounts of all the holes) by the total hole area.

[Method for Isolating or Detecting Rare Cell in Blood Specimen]

When the filtering in the treatment method according to the present disclosure is performed, the rare cell (if any) remains on the filter after the filtration of a blood specimen, and thus the rare cell may be isolated or detected. Therefore, another aspect of the present disclosure relates to a method for isolating or detecting a rare cell in a blood specimen including isolating or detecting a rare cell by treating a blood specimen with the treatment method according to the present disclosure.

[Labeling of Rare Cell in the Blood]

The rare cell in the blood may be labeled in the treatment method according to the present disclosure. In one or more embodiments, the labeling may be performed simultaneously with the isolation after the filtering, or after the isolation. The labeling of the rare cell is useful in the above-described isolating method or detecting method according to the present disclosure and in a method for measuring the number of the CTCs, which will be described later, and may be useful in the analysis of the isolated rare cell. Therefore, in some embodiments, the treatment method according to the present disclosure includes performing labeling. Moreover, the labeling of the rare cell is useful in a method for measuring the number of the CTCs, which will be described later, and can be useful in the analysis of the isolated rare cell. Therefore, in additional embodiments, the isolating method or detecting method according to the present disclosure includes performing labeling.

In one aspect, the labeling can be performed by bringing a known labeling reagent into contact with the rare cell, and typically by mixing the labeling reagent with a blood specimen. In another aspect, examples of the labels include a radioactive label, a fluorescent pigment label, pigment staining or a pigment label, a magnetic label, an electric-charge label, and combinations thereof, but are not limited thereto. The labeling may be performed using a labeling reagent suitable for each label.

That is, the rare cell can be labeled with a labeling method that can be used for a detecting method selected from a group consisting of a detecting method using a radioactive substance, a detecting method using luminescence, a detecting method using a pigment, a detecting method using magnetism, an electrical detecting method, an optical detecting method, and combinations thereof.

In the treatment method according to some embodiments of the present disclosure, the isolation or detection of the rare cell may be achieved by detecting the change in the above-mentioned filter electrically by weight, or optically.

[Method for Analyzing Rare Cell in Blood Specimen]

Another aspect of the present disclosure can relate to a method for analyzing a rare cell in a blood specimen including isolating or detecting a rare cell with the isolating method or detecting method according to the present disclosure and analyzing the rare cell with a method including observing the kinetics of the cell or measuring the activity of the cell or with a genetic method after the isolation or detection. That is, with the present disclosure, a viable cell may be captured, thus making it possible to isolate or detect a rare cell with the isolating method or detecting method according to the present disclosure and to analyze the rare cell with a method including observing the kinetics of the cell or measuring the activity of the cell, or with a genetic method after the isolation or detection. Moreover, the isolated rare cell may be collected and cultured. Alternatively gene analysis may be performed on the target cell on the filter, or the target cell may be collected from the filter and subjected to gene analysis. Examples of the gene analysis include analysis of chromosomes and analysis of a single base mutation, and a known technique can be used to analyze genes.

[Method for Measuring the Number of CTCs]

The number of CTCs in the blood may indicate or determine the degree of cancer metastases and the prognosis of cancer. Therefore, it is known that the research for using the CTCs as indices for the diagnosis of cancer, the prognosis of cancer, prediction or determination of progress, presence or absence of cancer is ongoing, and the number of CTCs in the blood is measured. With the treatment method according to the present disclosure and/or the isolating method or detecting method according to the present disclosure, the CTC, which is a rare cell, may be isolated while damage to the CTC is suppressed. Therefore, another aspect of the present disclosure relates to a method for measuring the number of CTCs in a blood specimen including treating the blood specimen with the treatment or filtering method according to the present disclosure to isolate or detect the rare cell, and/or isolating the CTC from the blood specimen with the isolating method or detecting method according to the present disclosure. It should be noted that the counting of the number of CTCs or the measurement of the nucleic acid of the CTC may be performed with flow cytometry simultaneously with the isolation after a cancer cell is measured from the morphological viewpoint or labeled appropriately or may be performed by observing the isolated cells under a microscope.

[Filter]

Yet another aspect of the present disclosure relates to a filter to be used in the treatment method according to some embodiments of the present disclosure, the isolating method or detecting method according to the present disclosure, and/or the method for measuring the number of CTCs according to the present disclosure, the filter including holes having a minor axis diameter of about 5 μm or more and 8 μm or less and a major axis diameter of about 40 μm or more at a hole density of about 40 holes/mm$^2$ or more and 2000 holes/mm$^2$ or less with a ratio (w/z) between the average major axis diameter (w) and the average gap length (z) between the holes in a minor axis diameter direction being about 7.0 or more and 130 or less. The holes of the filter according to the present disclosure have the same shape and the like as those of the filter used in the above-described treatment method according to the present disclosure.

[Rare Cell Capturing Apparatus]

Yet another aspect of the present disclosure relates to a rare cell capturing apparatus for capturing a rare cell contained in a specimen. In some embodiments, the rare cell capturing apparatus according to the present disclosure includes an inlet, an outlet, a channel with which the inlet and the outlet may be connected and in communication, and an isolating portion. The isolating portion may be arranged at a position corresponding to a portion of the channel, and includes the filter according to the present disclosure and a filter holding portion. With the rare cell capturing apparatus according to the present disclosure, the method for treating a blood specimen according to some embodiments of the present disclosure can be performed using the filter according to the present disclosure.

Figure 2:
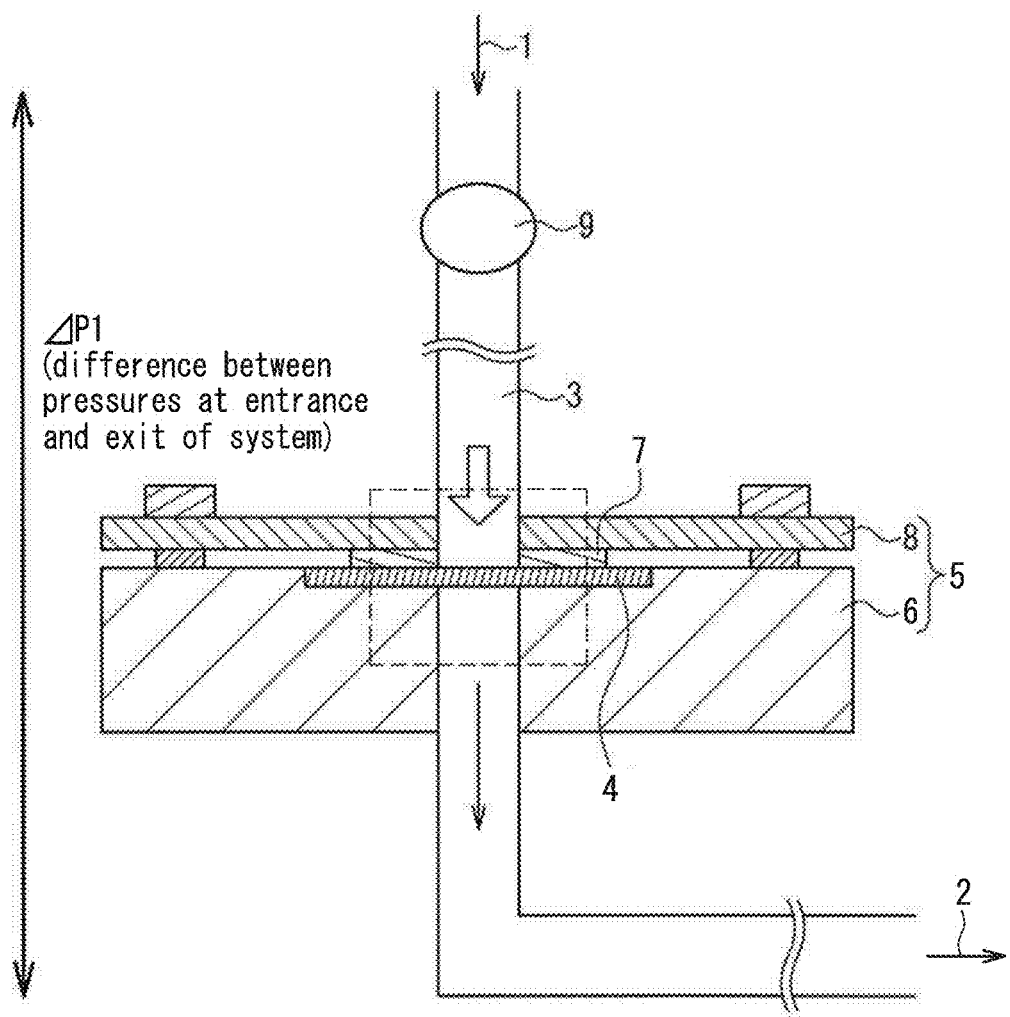
FIG. 2 shows an example of a rare cell capturing apparatus according to some embodiments of the present disclosure.
Figure 2:
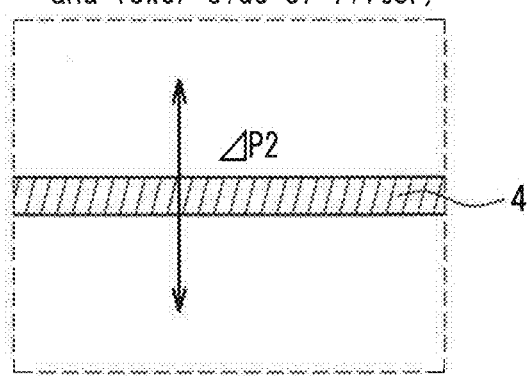

FIG. 2 shows an exemplary rare cell capturing apparatus according to the present disclosure. The rare cell capturing apparatus shown in FIG. 2 includes an inlet 1 for supplying a specimen, a washing liquid, a staining liquid, and the like to a filter, an outlet 2, a channel 3 with which the inlet 1 and the outlet 2 are connected and in communication, and an isolating portion that is arranged at a position corresponding to a portion of the channel 3. The isolating portion includes a filter 4 and a filter holder 5 for holding the filter 4. The filter holder 5 is constituted by a supporting portion (base) 6 on which the filter 4 can be mounted, an O-ring 7 for fixing the filter 4, and a cover 8. By mounting the filter 4 on the supporting portion (base) 6, putting the O-ring 7 and the cover 8 on the upper surface of the filter 4, and fixing the filter 4, the isolating portion (filtering device) provided with the filter with holes is formed. The channel 3, which connects the inlet 1 to the isolating portion, and the isolating portion to the outlet 2, is formed by connecting Safeed tubes (available from Terumo Corporation) to the two sides of the isolating portion. A connecting portion (not shown) and a three-way stopcock (not shown) capable of switching liquids may be arranged in the channel 3 connecting the inlet 1 to the isolating portion above the isolating portion. Moreover, a pressurizing means 9 (serving as a mechanism capable of performing feeding, supplying, pushing, or passing at a constant pressure or a mechanism capable of performing feeding, supplying, pushing, or passing at a constant flow amount) may be arranged in the channel 3 connecting the inlet 1 to the isolating portion to cause the pressure applied during filtration to be constant, or the feeding, supplying, pushing, or passing may be performed by performing sucking using a syringe pump such that the pressure applied during filtration is not greater than a certain pressure.

A kit or device for isolating a rare cell according to the present disclosure includes a filter of the present disclosure and a holding portion for holding the filter, and is configured to be attachable and detachable to and from a channel. In one or more embodiments, the kit or device for isolating a rare cell according to the present disclosure is used in the rare cell capturing apparatus and includes the filter of the present disclosure, the holding portion for holding the filter, and connecting portions. The connecting portions are capable of connecting the holding portion to the channel of the rare cell capturing apparatus, and are capable of passing the blood specimen from the rare cell capturing apparatus through the holding portion and the filter. The kit or device for isolating a rare cell is configured to be removably connected to and from the rare cell capturing apparatus. Therefore, in one or more embodiments of the rare cell capturing apparatus according to the present disclosure, the channel may include connecting portions that allow the kit or device for isolating a rare cell to be attachable and detachable. For example, the rare cell capturing apparatus shown in FIG. 2 may have two connecting portions: one is provided in a portion of the channel 3 between the pressurizing means 9 and the isolating portion, and the other is provided in a portion of the channel 3 between the isolating portion and the outlet 2. These connecting portions allow the isolating portion to be removably connected to and from the channel 3. The isolating portion that is configured to be attachable and detachable to and from the channel 3 is an example of the kit or device for isolating a rare cell according to the present disclosure. However, the kit or device for isolating a rare cell according to the present disclosure is not limited to this configuration.

The present disclosure can relate to the following one or more embodiments.

[1] A method for isolating or detecting a rare cell including filtering a blood specimen using a filter to isolate or detect a rare cell in the blood specimen, wherein the filter includes holes having an average minor axis diameter of 5 µm or more and 8 µm or less and an average major axis diameter of 40 µm or more and 5000 µm or less at a hole density of 40 holes/mm² or more and 2000 holes/mm² or less with a ratio (w/z) between the average major axis diameter (w) and an average gap length (z) between the holes in a minor axis diameter direction being 7.0 or more and 130 or less.

[2] The method according to [1], wherein the blood specimen is filtered such that a filtering capacity per hole of the filter is 0.1 nl/µm² or more and 3 nl/µm² or less in terms of a treatment capacity per hole area of the filter.

[3] The method according to [1] or [2], wherein the filter has an opening rate of 10% or more to 60% or less.

[4] The method according to any of [1] to [3], wherein a filtration pressure during the filtering is 0.1 kPa or more and 2.6 kPa or less.

[5] The method according to any of [1] to [4], wherein a difference between pressures on an upper surface and a lower surface of the filter during the filtering is 100 Pa or less.

[6] The method according to any of [1] to [5] wherein the filtering comprises supplying the blood specimen to the filter at an average flow rate of 1 mm/min or more and 600 mm/min or less per hole of the filter.

[7] The method according to any of [1] to [6], wherein the rare cell is a cell selected from the group consisting of a cancer cell, a circulating tumor cell, a vascular endothelial cell, a vascular endothelial precursor cell, a cancer stem cell, an epithelial cell, a hematopoietic stem cell, a mesenchymal stem cell, a fetal cell, and combinations thereof.

[8] The method according to any of [1] to [7], wherein the filter includes holes having an average minor axis diameter of 6 µm or more and 7 µm or less.

[9] The method according to any of [1] to [8], wherein the filter includes holes having an average major axis diameter of 80 µm or more and 90 µm or less.

[10] The method according to any of [1] to [9], wherein minor axis diameters of at least 80% of the holes in the filter are in a range of the average minor axis diameter±1 µm.

[11] The method according to any of [1] to [10], wherein major axis diameters of at least 80% of the holes in the filter are in a range of the average major axis diameter±3 µm.

[12] The method according to any of [1] to [11] wherein the filter includes holes at a hole density of 700 holes/mm² or more and 800 holes/mm² or less.

[13] The method according to any of [1] to [12], wherein the filter includes holes with a ratio (w/z) between the average major axis diameter (w) and an average gap length (z) between the holes in the average minor axis diameter direction being 10 or more and 70 or less.

[14] A method for analyzing a rare cell in a blood specimen including analyzing a rare cell with a method including observing a kinetics of the cell or measuring an activity of the rare cell, or with a genetic method after the rare cell is isolated or detected according to the method of any of [1] to [13].

[15] A filter to be used in the method according to any of [1] to [14], the filter including holes having a minor axis diameter of 5 μm or more and 8 μm or less and an average major axis diameter of 40 μm or more and 5000 μm or less at a hole density of 40 holes/mm² or more and 2000 holes/mm² or less with a ratio (w/z) between the average major axis diameter (w) and an average gap length (z) between the holes in a minor axis diameter direction being 7.0 or more and 130 or less.

[16] A rare cell capturing apparatus for capturing a rare cell contained in a specimen, the apparatus including: an inlet; an outlet; a channel with which the inlet and the outlet are connected; and an isolating portion, wherein the isolating portion is arranged at a position corresponding to a portion of the channel, and includes the filter according to [15] and a holding portion for holding the filter.

[17] Use of a filter according to [15] for isolating, detecting or analyzing a rare cell in a blood specimen.

[18] A kit or a device for isolating or detecting a rare cell detachably connected to a flow channel comprising a filter according to [9] and a filter-holding portion.

[19] A kit or device for isolating a rare cell including a filter according to [15] and a holding portion for holding the filter, and is configured to be attachable and detachable to and from a channel.

[20] A kit or device for isolating a rare cell for use in the rare cell capturing apparatus, the kit or device including a filter according to [15], a holding portion for holding the filter, and connecting portions, wherein the connecting portions are capable of connecting the holding portion to the channel of the rare cell capturing apparatus, and are capable of passing the blood specimen from the rare cell capturing apparatus through the holding portion and the filter.

[21] The kit or device according to [20], wherein the rare cell capturing apparatus is the rare cell capturing apparatus according to [16].

EXAMPLES

Hereinafter, the present disclosure will be described more specifically by way of examples and comparative examples, but these are merely exemplary and the present disclosure is not limited to these examples.

(Production of Filter)

Various filters shown in Table 1 were produced. The holes of filters #3 to #14 had the slit shape shown in item A in FIG. 1, and the holes of filter #2 had the shape shown in item B in FIG. 1. The w (μm) in Table 1 is the average major axis diameter of the hole, and z (μm) is the gap length between the holes in a minor axis diameter direction (see item A in FIG. 1).

TABLE 1

| | | Filter | | | | | | | | | |
|---|---|---|---|---|---|---|---|---|---|---|---|
| Filter # | Hole shape | Minor axis diameter (μm) × major axis diameter (μm) | Hole area (μm²) | w/z | Pitch between hole centers (minor axis diameter side × major axis diameter side) | Hole density (holes/mm²) | Opening rate (%) | Thickness (μm) | Material | Filtration area mm² | Total hole number |
| 1 | Circle | 6.5 × 6.5 | 33 | 0.9 | 14 × 19 | 3759 | 12 | 5 | Nickel (metal) | 20 | 73816 |
| 2 | Ellipse | 6.5 × 9.8 | 50 | 1.3 | 14 × 19 | 3759 | 19 | 5 | Nickel (metal) | 20 | 73816 |
| 3 | Slit | 5 × 88 | 440 | 9.8 | 14 × 100 | 714 | 31 | 5 | Nickel (metal) | 20 | 14025 |
| 4 | Slit | 6.5 × 88 | 572 | 7.3 | 18.5 × 100 | 541 | 31 | 5 | Nickel (metal) | 20 | 10613 |
| 5 | Slit | 8 × 88 | 704 | 6.1 | 22.5 × 100 | 444 | 31 | 5 | Nickel (metal) | 20 | 8727 |
| 6 | Slit | 6.5 × 40 | 260 | 5.3 | 16 × 52 | 1202 | 31 | 5 | Nickel (metal) | 20 | 23600 |
| 7 | Slit | 6.5 × 200 | 1300 | 15.4 | 19.5 × 212 | 242 | 31 | 5 | Nickel (metal) | 20 | 4750 |
| 8 | Slit | 6.5 × 500 | 3250 | 35.7 | 20.5 × 512 | 95 | 31 | 5 | Nickel (metal) | 20 | 1871 |
| 9 | Slit | 6.5 × 88 | 572 | 11.7 | 14 × 100 | 714 | 41 | 5 | Nickel (metal) | 20 | 14025 |
| 10 | Slit | 6.5 × 968 | 6292 | 129.1 | 14 × 1133 | 63 | 41 | 5 | Nickel (metal) | 20 | 1238 |
| 11 | Slit | 6.5 × 88 | 572 | 11.7 | 14 × 100 | 714 | 41 | 5 | Nickel (metal) | 79 | 56100 |
| 12 | Slit | 6.5 × 88 | 572 | 11.7 | 14 × 130 | 549 | 31 | 5 | Nickel (metal) | 20 | 10788 |
| 13 | Slit | 6.5 × 88 | 572 | 11.7 | 14 × 100 | 714 | 41 | 3 | Nickel (metal) | 79 | 56100 |
| 14 | Slit | 6.5 × 88 | 572 | 11.7 | 14 × 100 | 714 | 41 | 15 | Nickel (metal) | 79 | 56100 |

The average major axis diameter (w) and minor axis diameter of the filter were obtained by taking images of the holes at the center and the ends (deep, front, left, and right ends) of the filter with a microscope camera using a commercially available laser microscope VK-8510 (available from Keyence Corporation) equipped with a 10-fold to 100-fold objective lens, measuring the lengths of a long side and a short side of a rectangle circumscribed about each hole (50 or more holes) in the taken images by using software packaged with the microscope or commercially available image analysis software, and determining the averages. A metallographic microscope, an inverted microscope, and a microscope other than a laser microscope can also be used to perform the same measurements, and it is desirable to take images at a magnification that enables the measurement of a length of 1 µm or less.

The gap length (z) between the holes was obtained by taking an image of the filter using a commercially available optical microscope equipped with a 10-fold to 100-fold objective lens, and measuring the shortest straight line that links the rectangles circumscribed about the holes adjacent to each other in a minor axis diameter direction in the taken image by using software packaged with the microscope (50 points). Alternatively, since the gap lengths between the holes are substantially uniform, the average gap length between the holes was obtained by measuring the minor axis diameters at the centers of the major axis diameters in the longitudinal direction (50 points), and determining the average.

The total number of holes was determined by taking an image of the filter using a commercially available optical microscope equipped with a 10-fold to 100-fold objective lens, and directly counting the number of the holes included in the filter. Alternatively the total number of the holes was determined by multiplying the hole density per unit area by the filtration area.

The hole density was determined by measuring the lengths of pitches between the centers of the holes, and determining the number of the holes per square millimeter from the average value of the lengths of pitches by calculation.

(Preparation of Small Cancer Cell Sample)

[SW620 Sample]

According to a commonly used procedure, human colon cancer cells (SW620 cell line), which are adherent cells, were cultured in a petri dish, PBS(−) was added thereto after the culture medium was removed, and the cells were washed to remove the medium components and then subjected to a trypsin treatment (trypsin was available from Invitrogen) (37° C., 3 minutes). Culture medium supplemented with serum was added thereto, and the mixture was collected in a 15-ml centrifuge tube. The mixture was centrifuged using a centrifuge (CR20F: available from Hitachi), and the supernatant was removed. The cells were suspended in culture medium supplemented with serum again and collected. After being collected from the culture solution, the prepared cancer cell suspension was centrifuged at 1500 rpm at room temperature (24° C.) for 3 minutes using a centrifuge (CR20F/available from Hitachi). The supernatant was removed, PBS(−) was added thereto, and the cells were suspended. These cells suspended in PBS(−) were fluorescently stained using a staining reagent CellTracker (available from Invitrogen). The CellTracker was dissolved in DMSO such that the concentration was 10 mM, and then added to the cell suspension such that the final concentration during the reaction was 0.5 to 0.25 µM. After the reaction, the cell suspension was centrifuged to remove the supernatant, and the cells were resuspended in PBS. This operation was repeated to remove the unreacted solution and wash the cells. Thereafter, the cells were suspended in culture medium or PBS(−) such that the cell suspension had a desired concentration (about $10^3$ cells/mL to $5 \times 10^4$ cells/mL).

Next, a blood specimen was prepared by placing a portion of the blood (containing 3000 to 10000 cells/µl of leukocytes) collected in a blood-collecting vessel (EDTA-2K) in a specimen container for blood filtration that was in communication with a filtration device, adding 10 µL of the stained cancer cell suspension to the blood in the specimen container for blood filtration, and then adding and mixing the remaining blood. The SW620 cells have a diameter of about 13 µm, and thus were used as a model of small cells.

(Preparation of Sample of Cancer Cells Having a High Deformability)

[SNU-1 Sample]

Human stomach cancer cells (SNU-1 cell line), which are floating cells, were collected in a 15-ml centrifuge tube without performing a trypsin treatment. A blood specimen was prepared by performing the fluorescent staining and the addition to the blood in the same manner as in the preparation of the SW620 sample, except that the collected cancer cell suspension was used. Although the SNU-1 cells have a cell diameter of 16.8 µm, the SNU-1 cells more easily passed through the holes having a diameter of 6.5 µm than the SW620 cells.

[Colo320DM Sample]

Since some human colorectal cancer cells (Colo320DM cell line) are floating cells and others are adherent cells, the floating cells were collected in a 15-ml centrifuge tube, and the adherent cells were collected in the same centrifuge tube after the trypsin treatment was performed in the same manner as with the SW620 cells. A blood specimen was prepared by performing the fluorescent staining and the addition to the blood in the same manner as in the preparation of the SW620 sample, except that the collected cancer cell suspension was used. Although the Colo320DM cells have a cell diameter of 14 µm, the Colo320DM more easily passed through the holes having a diameter of 6.5 µm than the SW620 cells.

In the following examples and comparative examples, the SNU-1 cells and the Colo320DM cells were used as models of cells that are likely to deform and pass through the holes (cells having a high deformability).

Comparative Example 1

Filter #1 (average major axis diameter: 6.5 µm, average minor axis diameter: 6.5 µm, w/z: 0.9) was provided in the rare cell capturing apparatus shown in FIG. 2, and the filtration was performed under the following filtration conditions using the SW620 sample, the SNU-1 sample, and the Colo320DM sample to isolate and collect the cells. After the filtration, a buffer such as PBS(−) was fed at a ΔP1 of 0.4 kPa to wash the filter, the connecting portion connected above the isolating portion was slowly removed, and then a glass slide was slowly put on the filter to produce an observation surface. This was mounted on a fluorescent microscope, and the number of fluorescently stained cancer cells remaining on the filter was counted. The same amount of the above-mentioned cancer cell suspension as that of the suspension added to the blood was placed in a well of a microplate, and the number of cancer cells was counted under the fluorescent microscope. The capturing rate was calculated by dividing the number of cells remaining on the filter by the number of cells in the well of the microplate. Table 2 below shows the results.

<Filtration Conditions>

Total treatment amount of blood specimen: 1 ml, 4 ml, 8 ml

Filtration pressure in the entire system (ΔP1) during the specimen filtration: 1.3 kPa

TABLE 2

|  |  | Total treatment amount of blood | | |
|---|---|---|---|---|
|  |  | 1 ml | 4 ml | 8 ml |
| Small cells | SW620 | 100% | 93% | 101% |
| Cells having high | SNU-1 | 56% | 46% | 29% |
| deformability | Colo320DM | — | 73% | 37% |

Patent Document 5 (JP 2011-163830A) discloses that when a size-selective microcavity array having a diameter of 10 μm is used, the average collection rate for the SW620 cells is 38%. In contrast, it was found that with filter #1 with circular holes having a diameter of 6.5 μm, the SW620 cells could be captured at a high capturing rate of more than 90%. On the other hand, the capturing rates for the SNU-1 cells and the Colo320DM cells, which are cancer cells having a larger cell diameter than the SW620 cells but having a high deformability were lower than that of the SW620 cells. It was found that as the treatment amount of the blood increases, the capturing rate for the cells having a high deformability particularly further decreases. Thus, it was found that the cancer cells having a high deformability could not be captured sufficiently using the filter with circular holes having a diameter of 6.5 μm.

It is thought that the treatment amount of the blood is further reduced or the filtration area is increased in order to maintain the high capturing rates for both types of cells in filter #1. Alternatively the hole density may be increased, but this is not desirable because the durability of the filter is adversely affected.

Example 1

Figure 3:
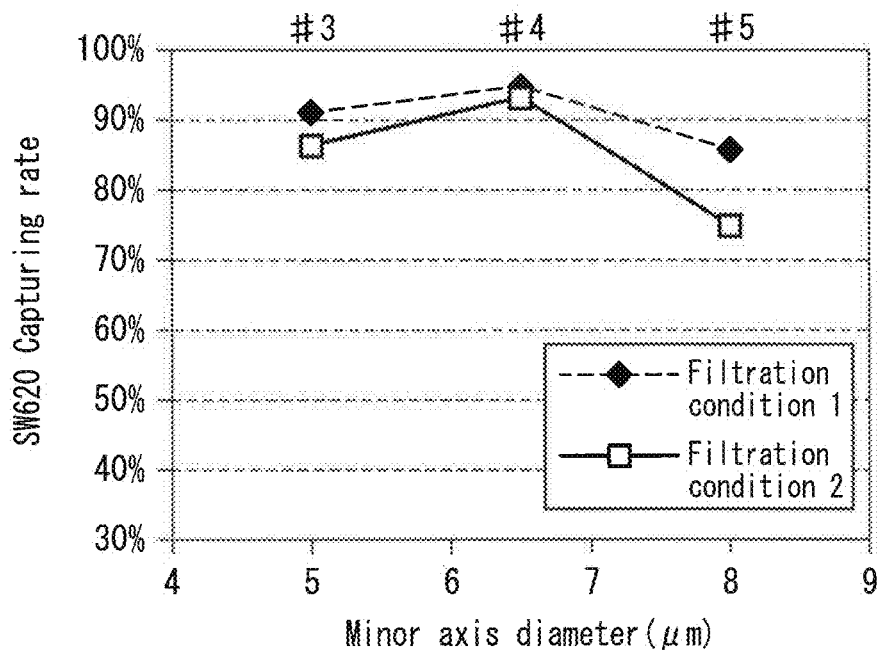
FIG. 3 is a graph showing results of Example 1.

In order to check the small cancer cell capturing performance, each of filters #3, #4 and #5, which had the same opening rate and major axis diameter (w), and differed in the minor axis diameter, was provided in the rare cell capturing apparatus shown in FIG. 2, the filtration was performed under filtration condition 1 or 2 below using the SW620 sample to isolate and collect the cells, and the capturing rate for the SW620 cells was determined. The isolation and collection of the cells, and the calculation of the capturing rate were performed in the same manner as in Comparative Example 1. FIG. 3 shows the results. It should be noted that the difference between pressures on the upper side and the lower side of the filter (ΔP2) was calculated based on the equation:

$$\Delta P_2 = Q/N_0 \times 12\eta L/[(1-0.63)(h/w)] \times (1/h^3 w)$$

where η was 4.5 mPa as described above.

<Filter>

Filter #3 (average minor axis diameter: 5.0 μm, average major axis diameter: 88 μm, w/z: 9.8)

Filter #4 (average minor axis diameter: 6.5 μm, average major axis diameter: 88 μm, w/z: 7.3)

Filter #5 (average minor axis diameter: 8.0 μm, average major axis diameter: 88 μm, w/z: 6.1)

<Filtration Conditions>

|  | Filtration condition 1 | Filtration condition 2 |
|---|---|---|
| Total treatment amount of blood specimen | 2 ml | 8 ml |
| Filtration pressure in entire system (ΔP1) | 1.3 kPa | 0.4 kPa |
| Total average of flow amount | 1 ml/min to 1.3 ml/min | 0.09 ml/min to 0.13 ml/min |
| Treatment amount per square micrometer of hole area | 0.33 nl/μm$^2$ | 1.3 nl/μm$^2$ |
| Difference between pressures on upper side and lower side of filter (calculated value) (ΔP2) | 12 Pa to 40 Pa | 1 Pa to 4 Pa |
| Average flow rate per hole | 160 mm/min to 220 mm/min | 14 mm/min to 22 mm/min |

FIG. 3 is a graph showing the relationship between the average minor axis diameter of the hole and the capturing rate for the small cells (SW620 cells). As shown in FIG. 3, when the treatment amount was 2 ml, the SW620 cells, which are cells having a relatively small diameter, could be captured at a capturing rate of more than 80% with any of the filters. In particular, when filter #4 having a minor axis diameter of 6.5 μm was used, the capturing rate was the highest. On the other hand, it was confirmed that in the case where the treatment amount was 8 ml, when filter #4 having a minor axis diameter of 6.5 μm was used, the capturing rate was the highest, but when filter #5 having a minor axis diameter of 8 μm was used, the capturing rate was less than 80%.

In the case where the SNU-1 cells, which are likely to deform, were used to perform the same measurements, when filter #3 having a minor axis diameter of 5 μm was used, the capturing rate was the lowest (data not shown).

Example 2

Figure 4:
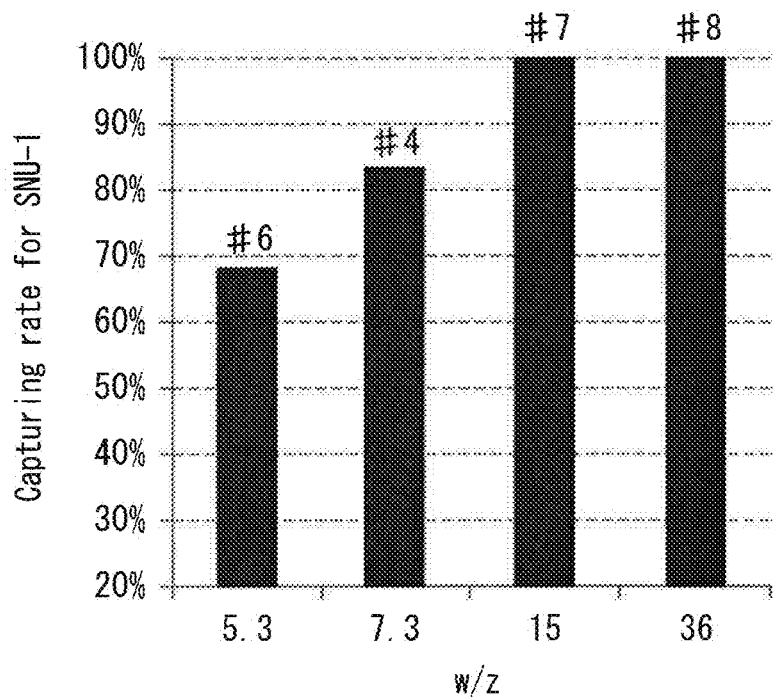
FIG. 4 is a graph showing results of Example 2.

The capturing of the cells and the calculation of the capturing rate were performed in the same manner as in Example 1, except that each of filters #6, #4, #7 and #8, which had the same minor axis diameter and opening rate (31%), was used and the filtration was performed under the following filtration conditions. The SNU-1 sample was used as a sample. FIG. 4 shows the results.

<Filter>

Filter #6 (average minor axis diameter: 6.5 μm, average major axis diameter: 40 μm, w/z: 5.3)

Filter #4 (average minor axis diameter: 6.5 μm, average major axis diameter: 88 μm, w/z: 7.3)

Filter #7 (average minor axis diameter: 6.5 μm, average major axis diameter: 200 μm, w/z: 15.4)

Filter #8 (average minor axis diameter: 6.5 μm, average major axis diameter: 500 μm, w/z: 35.7)

<Filtration Conditions>

| Total treatment amount of blood specimen | 4 ml |
| --- | --- |
| Filtration pressure in entire system (ΔP1) | 0.4 kPa |
| Total average of flow amount | 0.11 ml/min to 0.16 ml/min |
| Treatment amount per square micrometer of hole area | 0.7 nl/μm² |
| Difference between pressures on upper side and lower side of filter (calculated value) (ΔP2) | 2 Pa to 3 Pa |
| Average flow rate per hole | 18 mm/min to 26 mm/min |

FIG. 4 is a graph showing the relationship between the w/z and the capturing rate. As shown in FIG. 4, the SNU-1 cells could be collected at a high capturing rate of more than 80% with any of the filters having a w/z of 7.0 or more. It was confirmed that the SNU-1 cells could be collected at a higher capturing rate as the w/z value of the filter increased even in the case where the opening rates were the same. Moreover, since the SNU-1 cells could be collected at a low filtration pressure (ΔP1), which is a pressure in the entire system during the filtering, of 0.4 kPa (calculated value of the difference between the pressures on the upper side and the lower side of the filter (ΔP2): 2 Pa to 3 Pa), it is thought that damage to the collected rare cells can be reduced.

Example 3

Figure 5:
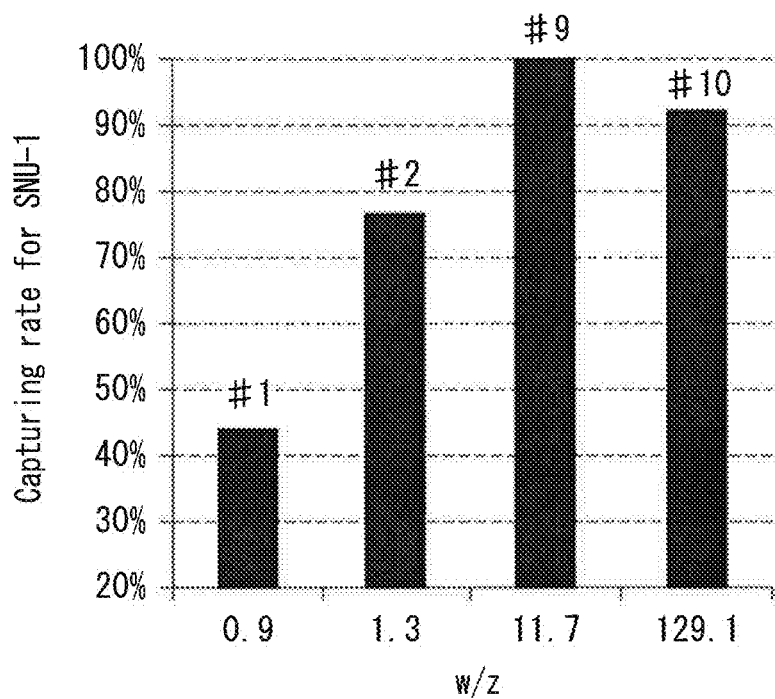
FIG. 5 is a graph showing results of Example 3.

The capturing of the cells and the calculation of the capturing rate were performed in the same manner as in Example 2, except that each of filters #9 and #10, which had the same minor axis diameter (6.5 μm) and z (length of the gap between the holes in a minor axis diameter direction) (7.5 μm), was used and the filtration was performed under filtration condition 3 or 4 below. FIG. 5 shows the results. It should be noted that as reference examples, the capturing of the cells and the calculation of the capturing rate were performed in the same manner, except that each of filter #1 (the average gap length (z) between the holes in a minor axis diameter direction was 7.5 μm) having circular holes and filter #2 (the average gap length (z) between the holes in a minor axis diameter direction was 7.5 μm) having elliptical holes, was used and the filtration was performed under reference filtration condition 1 or 2 below.

<Filter>

Filter #1 (average minor axis diameter: 6.5 μm, average major axis diameter: 6.5 μm, w/z: 0.9)

Filter #2 (average minor axis diameter: 6.5 μm, average major axis diameter: 9.8 μm, w/z: 1.3)

Filter #9 (average minor axis diameter: 6.5 μm, average major axis diameter: 88 μm, w/z: 11.7)

Filter #10 (average minor axis diameter: 6.5 μm, average major axis diameter: 968 μm, w/z: 129.1)

<Filtration Conditions>

| | Ex. | | Ref. Ex. | |
| --- | --- | --- | --- | --- |
| | Filtration condition 3 | Filtration condition 4 | Reference filtration condition 1 | Reference filtration condition 2 |
| Type of filter | #9 | #10 | #1 | #2 |
| w/z | 11.7 | 129.1 | 0.9 | 1.3 |
| Total treatment amount of blood specimen | 8 ml | 8 ml | 8 ml | 8 ml |
| Filtration pressure in entire system (ΔP1) | 0.4 kPa | 0.4 kPa | 0.4 kPa | 0.4 kPa |
| Total average of flow amount | 0.07 ml/min to 0.13 ml/min | 0.07 ml/min to 0.13 ml/min | 0.07 ml/min to 0.13 ml/min | 0.07 ml/min to 0.13 ml/min |
| Treatment amount per square micrometer of hole area | 1 nl/μm² | 1 nl/μm² | 3.3 nl/μm² | 2.2 nl/μm² |
| Difference between pressures on upper side and lower side of filter (calculated value) (ΔP2) | 1 Pa to 2 Pa | 1 Pa to 2 Pa | 8 Pa to 15 Pa | 4 Pa to 8 Pa |
| Average flow rate per hole | 11 mm/min to 17 mm/min | 11 mm/min to 17 mm/min | 27 mm/min to 54 mm/min | 24 mm/min to 36 mm/min |

FIG. 5 is a graph showing the relationship between the w/z and the capturing rate. As shown in FIG. 5, the SNU-1 cells could be collected at a high capturing rate of more than 90% with filters #9 and #10 (w/z is 7 or more). In particular, with filter #9 (average major axis diameter: 88 μm, w/z: 11.7), the occurrence of bending and distortion was suppressed compared with filter #10, and the SNU-1 cells could be captured at a capturing rate close to 100%.

Example 4

Figure 6:
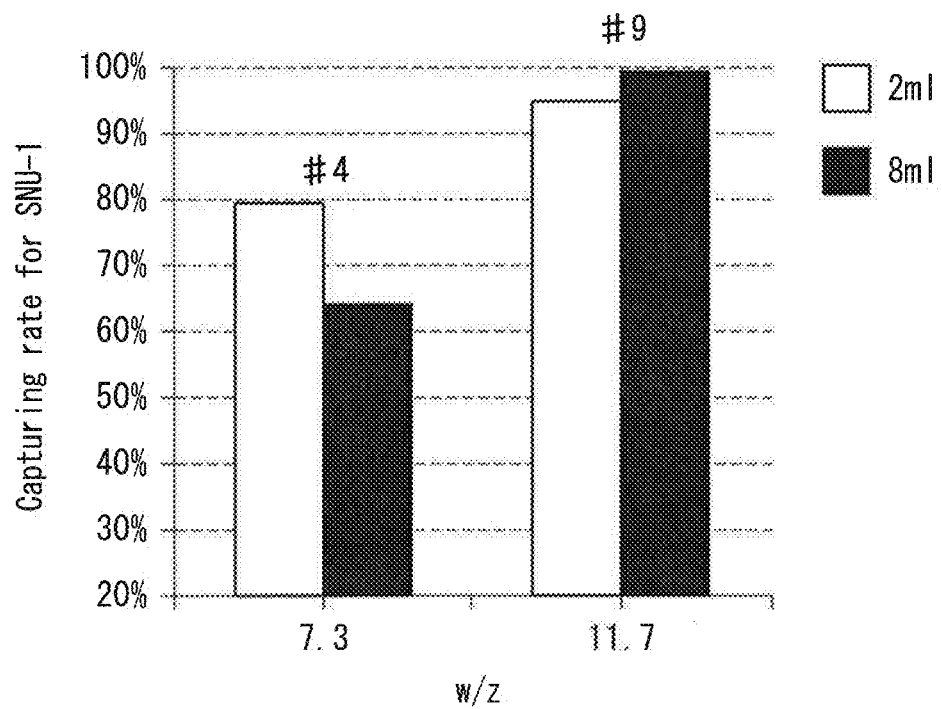
FIG. 6 is a graph showing results of Example 4.

The capturing of the cells and the calculation of the capturing rate were performed in the same manner as in Example 2, except that each of filters #4 and #9, which had the same minor axis diameter and major axis diameter (w), was used and the filtration was performed under any of filtration conditions 5 to 8 below. FIG. 6 shows the results.
<Filter>
Filter #4 (average minor axis diameter: 6.5 μm, average major axis diameter: 88 μm, w/z: 7.3)
Filter #9 (average minor axis diameter: 6.5 μm, average major axis diameter: 88 μm, w/z: 11.7)
<Filtration Conditions>

|  | Filtration condition 5 | Filtration condition 6 | Filtration condition 7 | Filtration condition 8 |
|---|---|---|---|---|
| Type of filter | #4 | #4 | #9 | #9 |
| w/z | 7.3 | 7.3 | 11.7 | 11.7 |
| Total treatment amount of blood specimen | 2 ml | 8 ml | 2 ml | 8 ml |
| Filtration pressure in entire system (ΔP1) | 0.4 kPa | 0.4 kPa | 0.4 kPa | 0.4 kPa |
| Total average of flow amount | 0.15 ml/min to 0.25 ml/min | 0.07 ml/min to 0.13 ml/min | 0.15 ml/min to 0.25 ml/min | 0.07 ml/min to 0.13 ml/min |
| Treatment amount per square micrometer of hole area | 0.33 nl/μm$^2$ | 1.3 nl/μm$^2$ | 0.25 nl/μm$^2$ | 1 nl/μm$^2$ |
| Difference between pressures on upper side and lower side of filter (calculated value) (ΔP2) | 2 Pa to 5 Pa | 1 Pa to 3 Pa | 2 Pa to 4 Pa | 1 Pa to 3 Pa |
| Average flow rate per hole | 27 mm/min to 41 mm/min | 11 mm/min to 22 mm/min | 21 mm/min to 31 mm/min | 11 mm/min to 17 mm/min |

FIG. 6 is a graph showing the relationship between the w/z and the capturing rate. In FIG. 6, the white bars show the results of the cases where the total treatment amount of the blood specimen was 2 ml (filtration conditions 5 and 7), and the black bars show the results of the cases where the total treatment amount of the blood specimen was 8 ml (filtration conditions 6 and 8). As shown in FIG. 6, with filter #4 having a w/z of 7.3, when the total treatment amount of the blood specimen was 8 ml, the capturing rate decreased, but when the total treatment amount of the blood specimen was 2 ml, the capturing rate was high. Surprisingly, with filter #9 having a w/z of 11.7, the SNU-1 cells could be captured at a high capturing rate close to 100% regardless of the total treatment amount of the blood specimen.

From the results of Examples 1 to 4 in which one or two of the opening rate, the average minor axis diameter, the average major axis diameter and the z were fixed and the w/z was varied, it was confirmed that setting the w/z to 7 or more made it possible to improve the capturing rate for the cell having a high deformability, and furthermore, to improve the capturing rate even when the total treatment amount of the blood was increased.

Example 5

The capturing of the cells and the calculation of the capturing rate were performed in the same manner as in Example 2, except that filter #9 (average minor axis diameter: 6.5 μm, average major axis diameter: 88 μm, w/z: 11.7) was used and the total treatment amount of the blood specimen was varied. The pressure during the filtration was as follows. Table 7 shows the results.
<Filtration Condition>
Filtration pressure in entire system (ΔP1): 0.4 kPa

TABLE 7

| Addition amount (total treatment amount of blood specimen) | 1 ml | 4 ml | 8 ml | 10 ml | 12 ml | 25 ml |
|---|---|---|---|---|---|---|
| Blood amount per hole (nl) | 71 | 285 | 570 | 713 | 856 | 1783 |
| Blood amount per hole area (nl/μm$^2$) | 0.1 | 0.5 | 1.0 | 1.2 | 1.5 | 3.1 |
| Capturing rate | — | 92% | 100% | 90% | 92% | 72% |

As shown in Table 7, the SNU-1 cells could be captured at a capturing rate of more than 70% in all cases. Moreover, it was confirmed that setting the treatment amount per hole area to be in a range of more than 0.1 nl/μm$^2$ to 3.1 nl/μm$^2$ or less made it possible to collect the SNU-1 at a higher capturing rate.

Example 6

The capturing of the cells and the calculation of the capturing rate were performed in the same manner as in Example 2, except that filter #9 or #10 was used, the total treatment amount of the blood specimen was 8 ml, and the filtration was performed under any of filtration conditions 9 to 12 below. FIG. 7 shows the results. It should be noted that as reference examples, the capturing of the cells and the calculation of the capturing rate were performed in the same manner, except that filter #2 having elliptical holes was used and the filtration was performed under reference filtration condition 3 or 4 below.
<Filter>
Filter #2 (average minor axis diameter: 6.5 μm, average major axis diameter: 9.8 μm, w/z: 1.5)

Filter #9 (average minor axis diameter: 6.5 μm, average major axis diameter: 88 μm, w/z: 11.7)

Filter #10 (average minor axis diameter: 6.5 μm, average major axis diameter: 968 μm, w/z: 129.1)

<Filtration Conditions>

|  | Ref. Ex. | Ex. | | Ref. Ex. | Ex. | |
|---|---|---|---|---|---|---|
|  | Reference filtration condition 3 | Filtration condition 9 | Filtration condition 10 | Reference filtration condition 4 | Filtration condition 11 | Filtration condition 12 |
| Type of filter | #2 | #9 | #10 | #2 | #9 | #10 |
| w/z | 1.3 | 11.7 | 129.1 | 1.3 | 11.7 | 129.1 |
| Total treatment amount of blood specimen | 8 ml | 8 ml | 8 ml | 8 ml | 8 ml | 8 ml |
| Filtration pressure in entire system (ΔP1) | 0.4 kPa | 0.4 kPa | 0.4 kPa | 1.3 kPa | 1.3 kPa | 1.3 kPa |
| Total average of flow amount | 0.07 ml/min to 0.13 ml/min | 0.07 ml/min to 0.13 ml/min | 0.07 ml/min to 0.13 ml/min | 0.3 ml/min to 0.6 ml/min | 0.3 ml/min to 0.6 ml/min | 0.3 ml/min to 0.6 ml/min |
| Treatment amount per square micrometer of hole area | 2.2 nl/μm$^2$ | 1 nl/μm$^2$ | 1 nl/μm$^2$ | 2.2 nl/μm$^2$ | 1 nl/μm$^2$ | 1 nl/μm$^2$ |
| Difference between pressures on upper side and lower side of filter (calculated value) (ΔP2) | 4 Pa to 8 Pa | 1 Pa to 2 Pa | 1 Pa to 2 Pa | 40 Pa to 60 Pa | 4 Pa to 9 Pa | 4 Pa to 9 Pa |
| Average flow rate per hole | 18 mm/min to 36 mm/min | 11 mm/min to 17 mm/min | 11 mm/min to 17 mm/min | 90 mm/min to 170 mm/min | 40 mm/min to 80 mm/min | 40 mm/min to 80 mm/min |

Figure 7A:
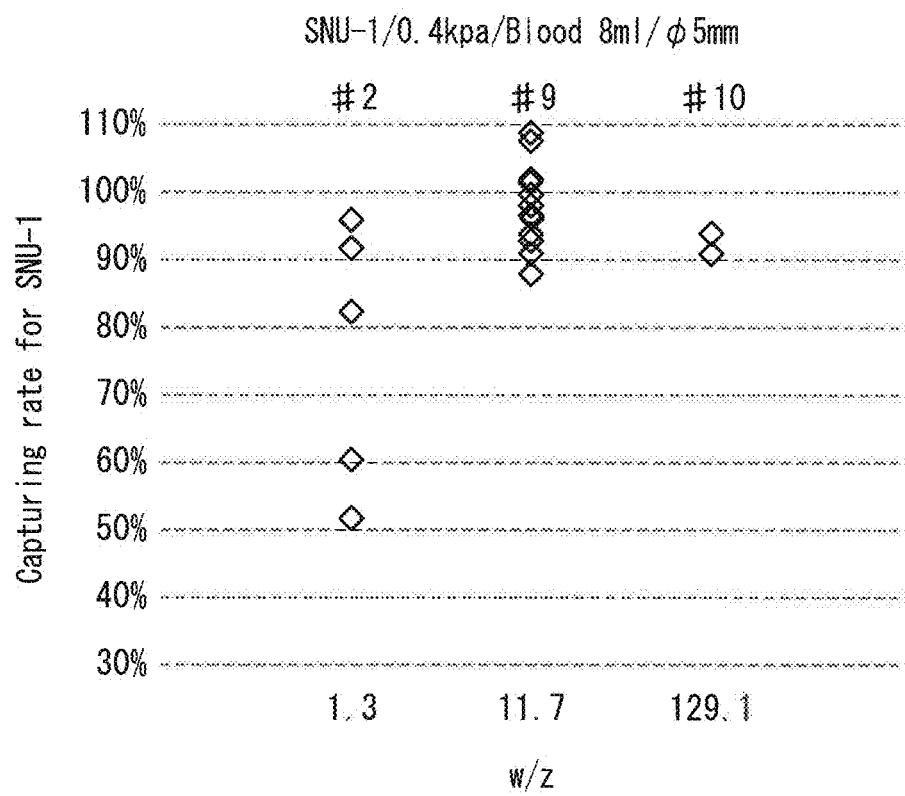
FIGS. 7A and 7B are graphs showing results of Example 5.
Figure 7B:
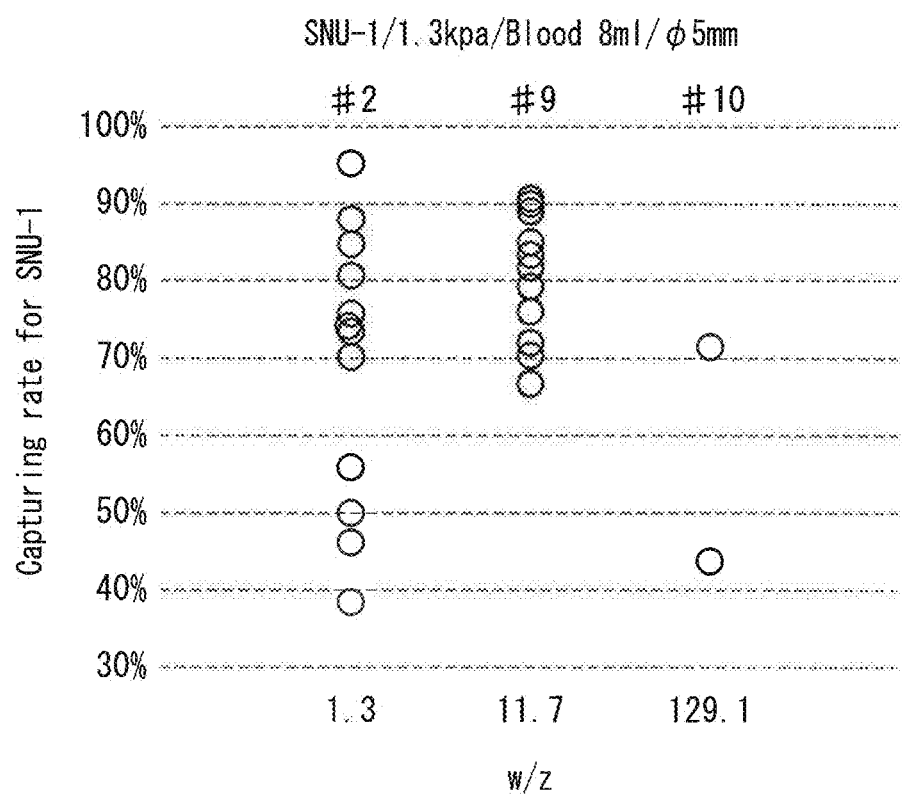

FIG. 7A and FIG. 7B are graphs showing the variations in the capturing rates of the filters. FIG. 7A shows the results of the case where the filtration pressure in the entire system (ΔP1) was 0.4 kPa (filtration conditions 9 and 10, and reference filtration condition 3), and FIG. 7B shows the results of the case where the filtration pressure in the entire system (ΔP1) was 1.3 kPa (filtration conditions 11 and 12, and reference filtration condition 4). It was confirmed that as shown in FIGS. 7A and 7B, with filters #9 and #10, the variations were smaller and the difference between the specimens was smaller compared with filter #2 under both the pressure conditions. It was confirmed that particularly with filter #9, the capturing rate was high, and the variations were very small under both the pressure conditions.

The capturing of the cells and the calculation of the capturing rate were performed in the same manner as in Examples 2 to 6, except that the SW620 sample was used instead of the SNU-1 sample. It was confirmed that the SW620 cells could be captured at a high capturing rate of more than 90% or close to 90%, with any of the filters or under the filtration conditions (data not shown).

Example 7

The capturing of the cells and the calculation of the capturing rate were performed using the SNU-1 cells, the SW620 cells, the Colo320DM cells, human lung cancer cells (NCI-H1703 cell line), human lung cancer cells (A549 cell line), human lung cancer cells (NCI-H1975 cell line), human lung cancer cells (NCI-H69 cell line), and human lung cancer cells (NCI-H1603 cell line) as cancer cell samples. Blood specimen samples were prepared in the same manner as in the above-mentioned preparation of the small cancer cell sample. Moreover, when the cells forming a large number of aggregates (e.g., NCI-H69 cells) are used, the number of the cells counted may vary, and therefore, a filtrate that was obtained by dispersing the cells using a dispersing agent FACSmax (available from Genlantis) according to the protocol, and then removing remaining aggregates that were not dispersed using a nylon mesh filter (available from Millipore) with 20-1 μm holes having a filtration area diameter of 13 mm was used as a cell suspension. As the filters, filter #9 and #11 (w/z=11.7, average major axis diameter=88 μm, average minor axis diameter=6.5 μm), which had different filtration areas but had the same minor axis diameter, major axis diameter, and w/z, were used. The filtration conditions were as follows. Tables 10 and 11 below show the results.

<Filtration Conditions>

| Type of filter | #9 | #11 |
|---|---|---|
| w/z | 11.7 | 11.7 |
| Total treatment amount of blood specimen | 8 ml | 8 ml |
| Filtration pressure in entire system (ΔP1) | 0.4 kPa | Constant flow amount feeding (syringe pump feeding) |
| Total average of flow amount | 0.07 ml/min to 0.13 ml/min | 0.25 ml/min |
| Treatment amount per square micrometer of hole area | 1 nl/μm$^2$ | 0.25 nl/μm$^2$ |
| Difference between pressures on upper side and lower side of filter (calculated value) (ΔP2) | 1 Pa to 2 Pa | 1 Pa |
| Average flow rate per hole | 11 mm/min to 17 mm/min | 8 mm/min |

TABLE 10

| Filter #9 | Lung cancer | | | | Colorectal cancer | | Stomach cancer |
|---|---|---|---|---|---|---|---|
| | NCI-H1703 | A549 | NCI-H1975 | NCI-H69 | Colo320DM | SW620 | SNU-1 |
| Cell size | 16.2 μm | 16.2 μm | 18.1 μm | 12.4 μm | 14 μm | 13 μm | 16.8 μm |
| Capturing rate | 98.8% | 96.5% | 96.4% | 87.7% | 97.5% | 95% | 99.6% |
| SD | — | — | — | 8% | 12% | 6% | 7% |

TABLE 11

| Filter #11 | Lung cancer | | | | | Colorectal cancer | Stomach cancer |
|---|---|---|---|---|---|---|---|
| | NCI-H1703 | A549 | NCI-H1975 | NCI-H69 | NCI-H1650 | SW620 | SNU-1 |
| Cell size | 16.2 μm | 16.2 μm | 18.1 μm | 12.4 μm | 18.6 μm | 13 μm | 16.8 μm |
| Capturing rate | 98% | 103% | 94% | 95% | 91% | 95% | 94% |
| SD | 10% | 3% | 3% | 3% | 5% | 6% | 7% |

Table 10 shows the capturing rates of filter #9 (filtration area: 20 mm$^2$), and Table 11 shows the capturing rates of filter #11 (filtration area: 79 mm$^2$). As shown in Tables 10 and 11 above, various cells could be efficiently captured regardless of the type of cells such as floating cells and adherent cells. Moreover, various cells could be efficiently captured regardless of the filtration area.

Example 8

Cancer cells were captured using a high-Hct specimen (i.e., a specimen having a high Hct value).

First, a high-Hct sample was prepared. The collected blood was divided into two 15-ml centrifuge tubes, and was centrifuged using a centrifuge at 1500×g for about 10 minutes. After the centrifugation, the separated layer of the blood plasma was transferred to another 15-ml centrifuge tube. The erythrocyte layer in one of the two centrifuge tubes containing only a hemocyte layer was transferred to the other centrifuge tube, and then the separated blood plasma was added thereto such that the Hct value was 60 or more to prepare a high-Hct blood specimen. Next, a high-Hct sample was prepared in the same manner as the above-mentioned SNU-1 sample, except that the prepared high-Hct blood specimen was used instead of the blood. It should be noted that the Hct value of the prepared high-Hct blood sample was determined using a hemocyte counter SB-1440 (available from Arkray Inc.).

Figure 8:
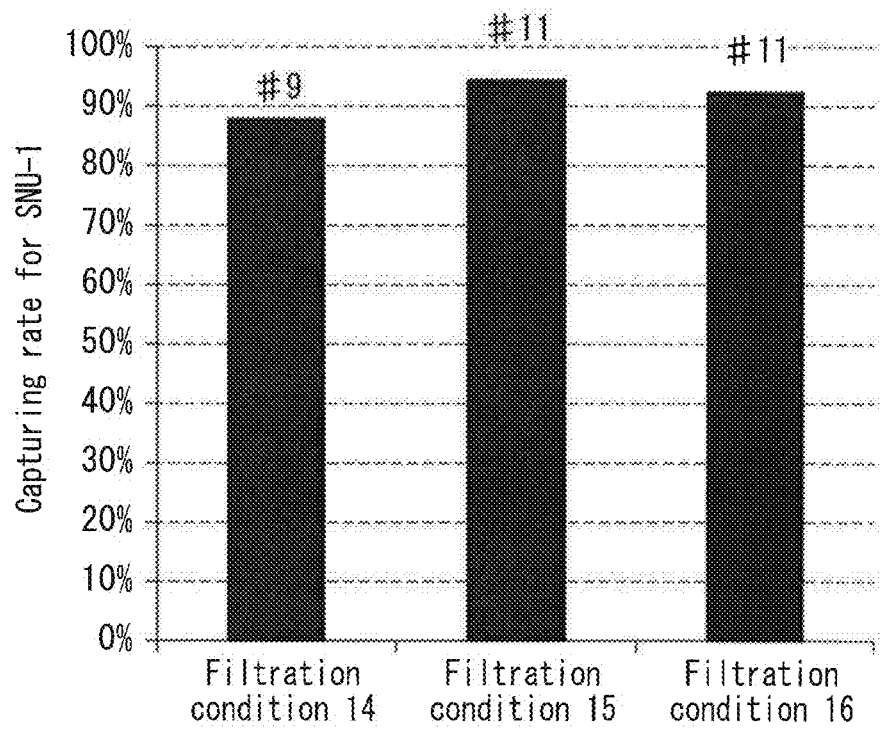
FIG. 8 is a graph showing results of Example 8.

The capturing of the cells and the calculation of the capturing rate were performed in the same manner as in Example 1, except that each of the prepared high-Hct samples (three types) and filters #9 and #11 were used and the filtration was performed under any of filtration conditions 13 to 15 below. FIG. 8 shows the results.

| | Filtration condition 13 | Filtration condition 14 | Filtration condition 15 |
|---|---|---|---|
| Hct | 62% | 65% | 63% |
| Type of filter | #9 | #11 | #11 |
| w/z | 11.7 | 11.7 | 11.7 |
| Total treatment amount of blood specimen | 8 ml | 8 ml | 8 ml |
| Filtration pressure in entire system (ΔP1) | 0.4 kPa | 0.75 kPa | Constant flow amount feeding using syringe pump |
| Total average of flow amount | 0.05 ml/min | 0.13 ml/min | 0.25 ml/min |
| Treatment amount per square micrometer of hole area | 1 nl/μm$^2$ | 0.25 nl/μm$^2$ | 0.25 nl/μm$^2$ |
| Difference between pressures on upper side and lower side of filter (calculated value) (ΔP2) | 0.5 Pa | 0.6 Pa | 1 Pa |
| Average flow rate per hole | 6 mm/min | 4 mm/min | 8 mm/min |

As shown in FIG. 8, even when the high-Hct samples having an Hct of more than 60% were used, the SNU-1 cells could be captured at a high capturing rate of more than 90% or close to 90%.

Example 9

Cancer cells were captured using a high-leukocyte specimen (i.e., a specimen including a large number of leukocytes).

First, a high-leukocyte sample was prepared. Leukocytes that had been isolated and collected using HetaSep (available from STEMCELL Technologies) was mixed with the blood to prepare a high-leukocyte blood specimen. Next, a high-leukocyte sample was prepared in the same manner as the above-mentioned SNU-1 sample, except that the prepared high-leukocyte blood specimen was used instead of the blood. It should be noted that the number of leukocytes in the prepared high-leukocyte sample was determined using a hemocyte counter SB-1440 (available from Arkray Inc.).

Figure 9:
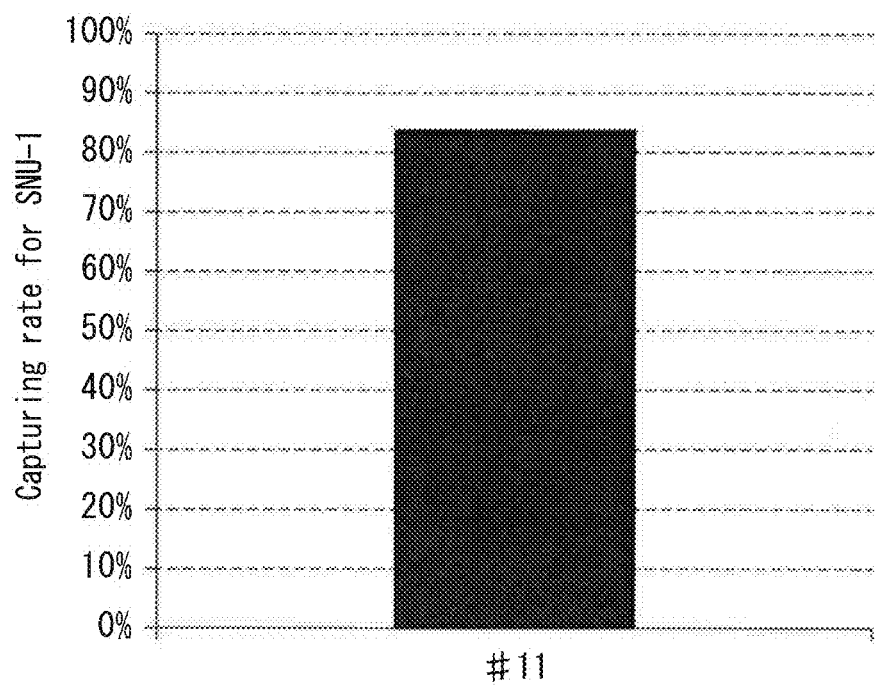
FIG. 9 is a graph showing results of Example 9.

The capturing of the cells and the calculation of the capturing rate were performed in the same manner as in Example 1, except that the prepared high-leukocyte sample and filter #11 were used and the filtration was performed under the following filtration conditions. FIG. 9 shows the results.

<Filtration Conditions>

| | |
|---|---|
| Leukocyte number | 174 × $10^2$ cells/μL |
| Type of filter | #11 |
| w/z | 11.7 |
| Total treatment amount of blood specimen | 8 ml |
| Filtration pressure in entire system (ΔP1) | 0.75 kPa |
| Total average of flow amount | 0.04 ml/min |
| Treatment amount per square micrometer of hole area | 0.25 nl/μm² |
| Difference between pressures on upper side and lower side of filter (calculated value) (ΔP2) | 1.4 Pa |
| Average flow rate per hole | 12 mm/min |

As shown in FIG. 9, even when the high-leukocyte sample in which the number of leukocytes was more than 10,000 cells/μL was used, the SNU-1 cells could be captured at a high capturing rate of more than 80%.

Comparative Example 2

A filter having the same hole arrangement (average minor diameter of 8 μm×average major diameter of 100 μm, w/z=6.7, filtration area: 20 mm²) as that of the filter described in Non-Patent Document 6 was used to evaluate the capturing rates for the SW620 sample, the SNU-1 sample, and the NCI-H69 sample. The filtration was performed under filtration conditions such that 8 ml of each blood specimen sample was fed at 0.4 kPa, and the capturing of the cells and the calculation of the capturing rate were performed in the same manner as in Example 1. Table 14 below shows the obtained capturing rates. Moreover, the capturing experiment was performed using filter #9 under the same filtration conditions. Table 14 below also shows the results.

TABLE 14

| | Colorectal cancer SW620 | Stomach cancer SNU-1 | Lung cancer NCI-H69 |
|---|---|---|---|
| Filter of Comp. Ex. 2 | 75% | 65% | 46% |
| Filter #9 (Ex.) | 95% | 98% | 93% |

As shown in Table 14 above, in the case where filter #9 (minor axis diameter: 6.5 μm, major axis diameter: 88 μm, w/z: 11.7) was used, the capturing rate was more than 90%, and all of the capturing rates for the colorectal cancer cells, the stomach cancer cells, and the lung cancer cells were higher compared with the filter disclosed in Non-Patent Document 6. Therefore, it can be said that use of the filters such as filter #9 according to the present disclosure makes it possible to achieve the improvement of the capturing rates for a small cancer cell and a cell that is likely to deform compared with the filter disclosed in Non-Patent Document 6.

Example 10

Figure 10:
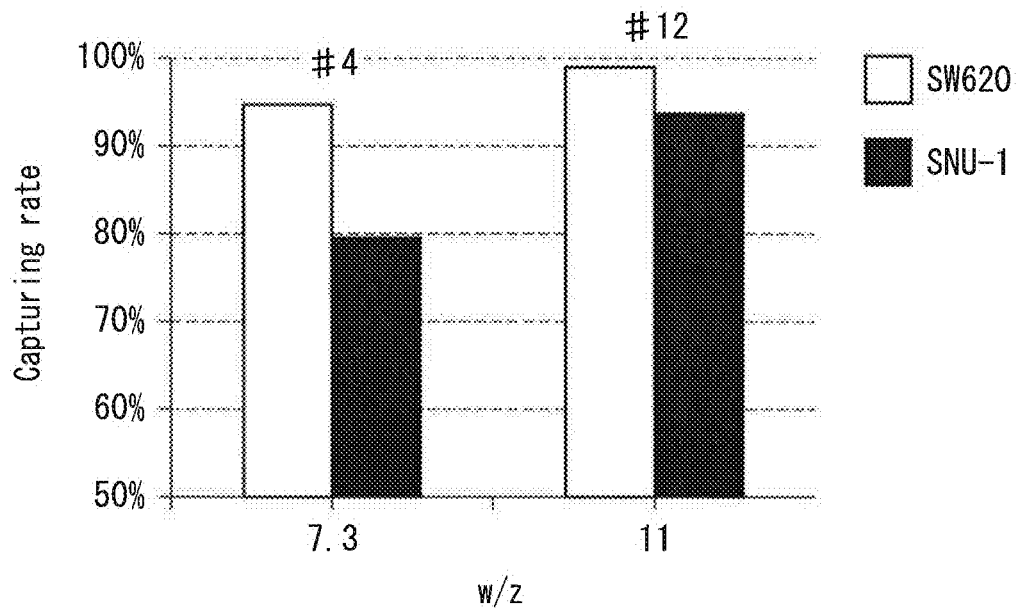
FIG. 10 is a graph showing results of Example 10.

The capturing of the cells and the calculation of the capturing rate were performed in the same manner as in Example 1, except that each of filters #4 and #12, which had the same opening rate, minor axis diameter, and major axis diameter (w), was used, the SW620 sample and the SNU-1 sample were used, and the filtration was performed under filtration condition 16 below. FIG. 10 shows the results.

<Filter>

Filter #4 (average minor axis diameter: 6.5 μm, average major axis diameter: 88 μm, w/z: 7.3)

Filter #12 (average minor axis diameter: 6.5 μm, average major axis diameter: 88 μm, w/z: 11.7)

<Filtration Conditions>

| | Filtration condition 16 |
|---|---|
| Total treatment amount of blood specimen | 4 ml |
| Filtration pressure in entire system (ΔP1) | 0.4 kPa |
| Total average of flow amount | 0.11 ml/min to 0.16 ml/min |
| Treatment amount per square micrometer of hole area | 0.7 nl/μm² |
| Difference between pressures on upper side and lower side of filter (calculated value) (ΔP2) | 2 Pa to 3 Pa |
| Average flow rate per hole | 18 mm/min to 26 mm/min |

FIG. 10 is a graph showing the relationship between the w/z and the capturing rate. In FIG. 10, the white bars show the results of the cases where the SW620 sample was used, and the black bars show the results of the cases where the SNU-1 sample was used. As shown in FIG. 10, when the w/z was 7 or more, the SW620 cells and the SNU-1 cells could be captured at a capturing rate of 80% or more, and in particular, when the w/z was 11 or more, the SW620 cells and the SNU-1 cells could be captured at a high capturing rate of 90% or more.

Example 11

Figure 11:
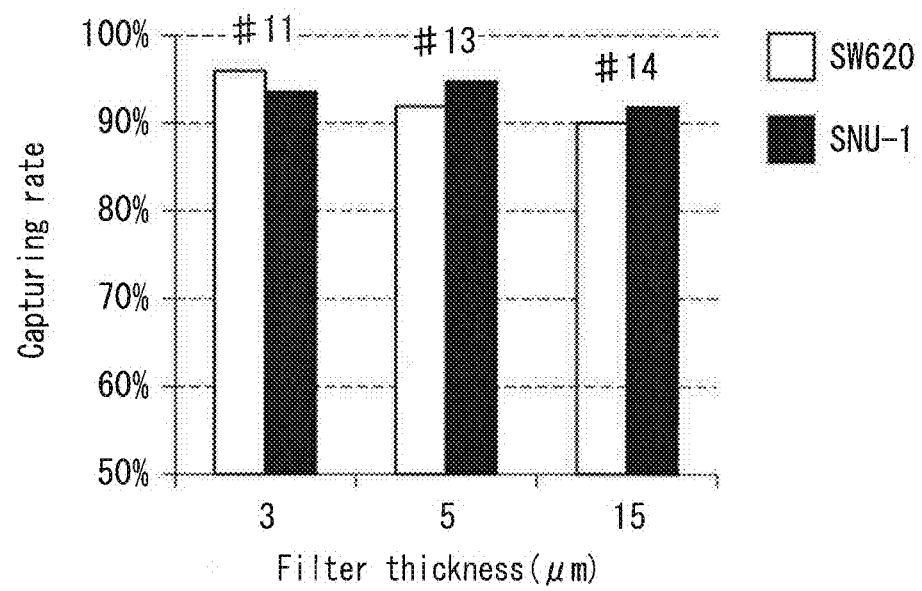
FIG. 11 is a graph showing results of Example 11.

The capturing of the cells and the calculation of the capturing rate were performed in the same manner as in Example 1, except that each of filters #11, #13, and #14, which differed in thickness, was used, the SW620 sample and the SNU-1 sample were used, and the filtration was performed under filtration condition 17 below. FIG. 11 shows the results.

<Filter>

Filter #11 (average major axis diameter: 88 μm, w/z: 11.7, thickness: 5 μm)

Filter #13 (average major axis diameter: 88 μm, w/z: 11.7, thickness: 3 μm)

Filter #14 (average major axis diameter: 88 μm, w/z: 11.7, thickness: 15 μm)

<Filtration Conditions>

|  | Filtration condition 17 |
| --- | --- |
| w/z | 11.7 |
| Total treatment amount of blood specimen | 8 ml |
| Filtration pressure in entire system (ΔP1) | 0.75 kPa |
| Total average of flow amount | 0.25 ml/min to 0.5 ml/min |
| Treatment amount per square micrometer of hole area | 0.25 nl/μm$^2$ |
| Difference between pressures on upper side and lower side of filter (calculated value) (ΔP2) | 1 Pa to 2 Pa |
| Average flow rate per hole | 8 mm/min to 16 mm/min |

FIG. 11 is a graph showing the relationship between the filter thickness and the capturing rate. In FIG. 11, the white bars show the results of the cases where the SW620 sample was used, and the black bars show the results of the cases where the SNU-1 sample was used. As shown in FIG. 11, even when any of the filters, which differed in thickness, was used, the SW620 cells and the SNU-1 cells could be captured at a high capturing rate of more than 90%.

Example 12

Figure 12:
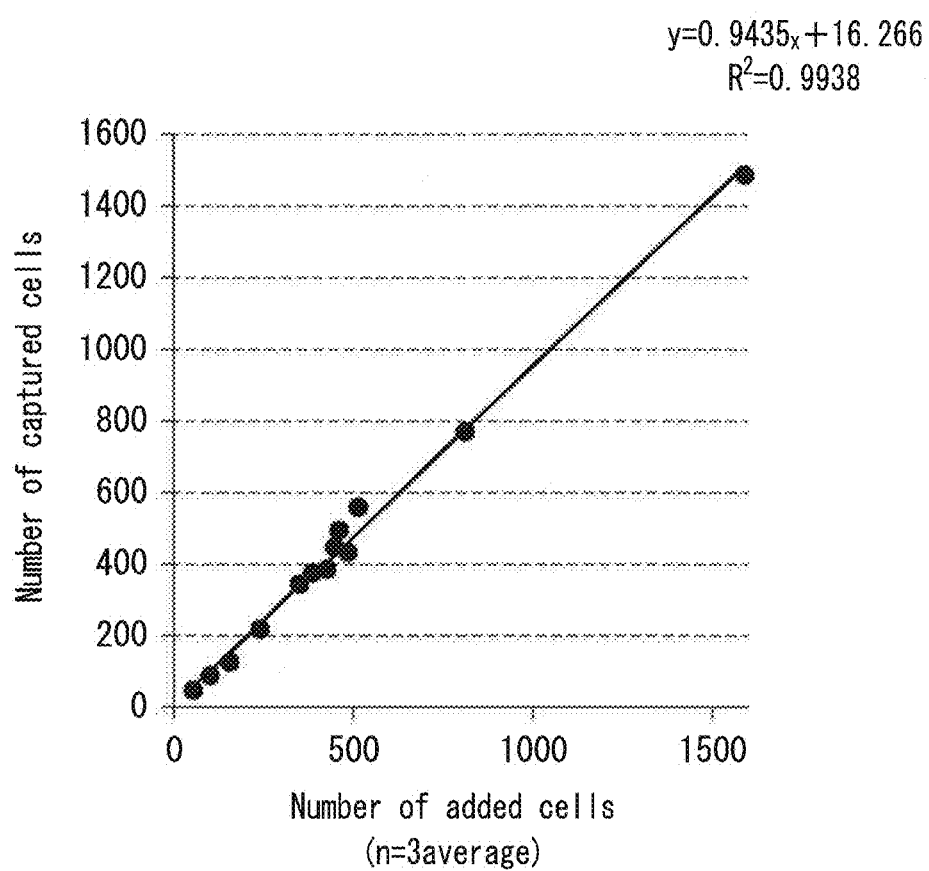
FIG. 12 is a graph showing results of Example 12.

The capturing of the cells and the calculation of the capturing rate were performed in the same manner as in Example 1, except that filter #9 was used, a plurality of SNU-1 samples that differed in the number of cells contained therein were used, and the filtration was performed under filtration condition 18 below. FIG. 12 shows the results.

<Filtration Conditions>

|  | Filtration condition 18 |
| --- | --- |
| w/z | 11.7 |
| Total treatment amount of blood specimen | 8 ml |
| Filtration pressure in entire system (ΔP1) | 0.4 kPa |
| Total average of flow amount | 0.07 ml/min to 0.13 ml/min |
| Treatment amount per square micrometer of hole area | 1 nl/μm$^2$ |
| Difference between pressures on upper side and lower side of filter (calculated value) (ΔP2) | 1 Pa to 2 Pa |
| Average flow rate per hole | 11 mm/min to 17 mm/min |

FIG. 12 is a graph showing the relationship between the number of cells contained in the sample and the number of captured cells. As shown in FIG. 12, the SNU-1 cells could be captured at a high capturing rate regardless of the number of cells contained in the sample.

What is claimed is:

1. A method of isolating or detecting a rare cell having a high deformability, comprising filtering a blood specimen through a filter to isolate or detect a rare cell having a high deformability in the blood specimen,
    wherein the filter includes slit shape holes having an average minor axis diameter of 5 μm or more and 8 μm or less and an average major axis diameter of 40 μm or more and 5000 μm or less at a hole density of 40 holes/mm$^2$ or more and 2000 holes/mm$^2$ or less with a ratio (w/z) between the average major axis diameter (w) and an average gap length (z) between the holes in a minor axis diameter direction being 7.0 or more and 130 or less,
    wherein the filter is operated under filtration conditions such that the filter provides, with respect to the rare cell, a capturing rate of 80% or more.

2. The method according to claim 1, wherein the blood specimen is filtered such that a filtering capacity per hole of the filter is 0.1 nl/μm$^2$ or more and 3 nl/μm$^2$ or less in terms of a treatment capacity per hole area of the filter.

3. The method according to claim 1, wherein the filter has an opening rate of 10% or more to 60% or less.

4. The method according to claim 1, wherein a filtration pressure during the filtering is 0.1 kPa or more and 2.6 kPa or less.

5. The method according to claim 1, wherein a difference between pressures on an upper surface and a lower surface of the filter during the filtering is 100 Pa or less.

6. The method according to claim 1, wherein the filtering comprises supplying the blood specimen to the filter at an average flow rate of 1 mm/min or more and 600 mm/min or less per hole of the filter.

7. The method according to claim 1, wherein the rare cell is a cell selected from the group consisting of a cancer cell, a circulating tumor cell, a vascular endothelial cell, a vascular endothelial precursor cell, a cancer stem cell, an epithelial cell, a hematopoietic stem cell, a mesenchymal stem cell, a fetal cell, and combinations thereof.

8. A method of analyzing a rare cell in a blood specimen, comprising observing a kinetics, measuring an activity or analyzing a gene of the rare cell after the rare cell is isolated or detected according to the method of claim 1.

9. The method according to claim 1, wherein the filter has a hole density of 40 holes/mm$^2$ or more and 900 holes/mm$^2$ or less.

10. The method according to claim 1, wherein the holes have an average major axis diameter of 40 μm or more and 500 μm or less.

11. The method according to claim 1, wherein the ratio (w/z) is 7.3 or more and 129.1 or less.

12. The method according to claim 1, wherein the holes have an average major axis diameter of 88 μm or more and 500 μn or less.

13. The method according to claim 1, wherein the holes have an average gap length (z) of 7.5 μm or more and 12 μm or less.

* * * * *